United States Patent
Taki

(10) Patent No.: US 7,983,234 B2
(45) Date of Patent: Jul. 19, 2011

(54) WIRELESS COMMUNICATION APPARATUS WITH A BLOCK ACKNOWLEDGEMENT FUNCTION AND A WIRELESS COMMUNICATION METHOD

(75) Inventor: Daisuke Taki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 864 days.

(21) Appl. No.: 11/877,121

(22) Filed: Oct. 23, 2007

(65) Prior Publication Data
US 2008/0095127 A1 Apr. 24, 2008

(30) Foreign Application Priority Data
Oct. 24, 2006 (JP) .................. 2006-288868

(51) Int. Cl.
*H04L 12/28* (2006.01)
*H04W 4/00* (2009.01)

(52) U.S. Cl. ............ 370/338; 370/395.4; 370/401

(58) Field of Classification Search ............ 370/328, 370/329, 277, 280, 395.1, 474, 470, 395.53, 370/338, 278, 349, 282, 394; 714/748, 749
See application file for complete search history.

(56) References Cited

U.S. PATENT DOCUMENTS

| | | | |
|---|---|---|---|
| 7,535,858 B2 * | 5/2009 | Trainin et al. .............. | 370/278 |
| 7,734,978 B2 * | 6/2010 | Nakashima ................. | 714/748 |
| 2005/0195858 A1 * | 9/2005 | Nishibayashi et al. ....... | 370/474 |
| 2009/0232053 A1 * | 9/2009 | Taki et al. .................... | 370/328 |

OTHER PUBLICATIONS

U.S. Appl. No. 12/402,683, filed Mar. 12, 2009, Taki et al.
"IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 8: Medium Access Control (MAC) Quality of Service Enhancements", IEEE Computer Society, IEEE Std 802.11e™-2005, Nov. 11, 2005, pp. iii-xx, 96-100 and three cover pages (Total of 26 pages).
"IEEE P802.11n™/D1.0 Draft Amendment to Standard [for] Information Technology—Telecommunications and information exchange between systems—Local and Metropolitan networks—Specific requirements—Part 11: Wireless LAN Medium Access Control (MAC) and Physical Layer (PHY) specifications: Enhancements for Higher Throughput", IEEE 802.11 Working Group of the 802 Committee, Mar. 2006, pp. 91-96 and 7 cover pages.

* cited by examiner

*Primary Examiner* — Hanh Nguyen
(74) *Attorney, Agent, or Firm* — Oblon, Spivak, McClelland, maier & Neustadt, L.L.P.

(57) ABSTRACT

A wireless communication apparatus includes management units and a decision unit. The apparatus is capable of receiving a plurality of items of data each including data frames each transmitted from the same data transmitter and managed under the same traffic identifier. The apparatus acknowledges the transmission of the data for the data transmitter in response to the reception of the data. Each of the management units holds acknowledgement information to acknowledge the transmission for each of the items of data. The decision unit, when the data is newly received, causes any one of the management units whose information amount of the acknowledgement information already held is smaller not only to discard the acknowledgement information but also to hold the acknowledgement information on the newly received data.

14 Claims, 15 Drawing Sheets

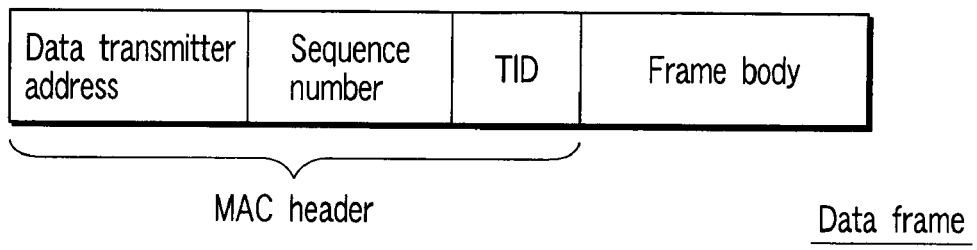
FIG. 8
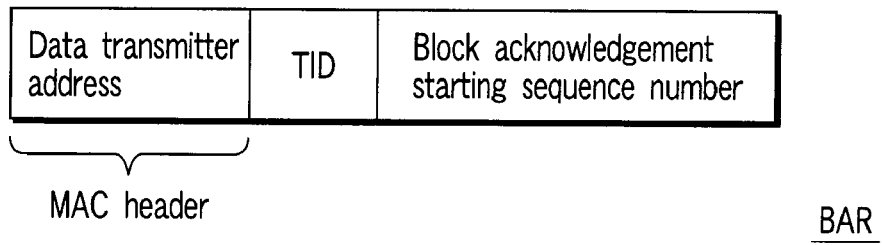
FIG. 9
| Management unit number | Continuous transmission possible period |
|---|---|
| Management unit 37-1 | TXOP1 |
| Management unit 37-2 | TXOP2 |
| Management unit 37-3 | TXOP3 |
| ⋮ | ⋮ |
| Management unit 37-n | TXOPn |
Management table
FIG. 11

| Management unit number | BAR reception time |
|---|---|
| Management unit 37-1 | Time t1 |
| Management unit 37-2 | Time t2 |
| Management unit 37-3 | Time t3 |
| ⋮ | ⋮ |
| Management unit 37-n | Time tn |

Management table

| Management unit number | Number of frames received properly |
|---|---|
| Management unit 37-1 | Number of frames n1 |
| Management unit 37-2 | Number of frames n2 |
| Management unit 37-3 | Number of frames n3 |
| ⋮ | ⋮ |
| Management unit 37-n | Number of frames nn |

Management table

WIRELESS COMMUNICATION APPARATUS WITH A BLOCK ACKNOWLEDGEMENT FUNCTION AND A WIRELESS COMMUNICATION METHOD

CROSS-REFERENCE TO RELATED APPLICATIONS

This application is based upon and claims the benefit of priority from prior Japanese Patent Application No. 2006-288868, filed Oct. 24, 2006, the entire contents of which are incorporated herein by reference.

BACKGROUND OF THE INVENTION

1. Field of the Invention

This invention relates to a wireless communication apparatus and a wireless communication method, and more particularly to a wireless communication apparatus which acknowledges the transmission of a plurality of packets in a lump.

2. Description of the Related Art

The IEEE 802.11n standard, a standard for next-generation high-speed wireless local area network (LAN), is now being developed by the Institute of Electrical and Electronics Engineers (IEEE) 802.11 committee.

In the IEEE 802.11n standard, a partial state block acknowledgement function obtained by simplifying the block acknowledgement function has been employed. The block acknowledgement function has been described in, for example, "IEEE Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements," Internet URL: ieeexplore.ieee.org/xpl/tocresult.jsp?isnumber=32891& is Year=0. In the partial state block acknowledgement function, when a plurality of data items differing in data transmitters or traffic identifiers have been received, the management area is set free by discarding acknowledge information on another data held until then in the management area. Then, acknowledgement information on new data is held in the same management area. The details of this method has been described in, for example, "IEEE P802.11n/D1.0 Draft Amendment to STANDARD [FOR] Information Technology—Telecommunications and information exchange between systems—Local and Metropolitan networks—Specific requirements Part 11: Wireless LAN Medium Access Control (MAC) and Physical Layer (PHY) specifications: Enhancements for Higher Throughput," Internet URL: grouper.ieee.org/groups/802/11/. With the method, making full use of the same management area enables the block acknowledgement function to be realized with at least one management area for acknowledgement information.

With the above methods, however, acknowledgement information might be discarded before the transmission of data is acknowledged, or although data has not been transmitted properly. In this case, the communication apparatus which has received the data has to acknowledge the transmission of data by informing the transmitter that the data has not been received. As a result, the following problem has arisen: already received data is also transmitted again, decreasing the transmitting efficiency.

BRIEF SUMMARY OF THE INVENTION

A wireless communication apparatus which is capable of receiving a plurality of items of data each including a plurality of data frames each transmitted from the same data transmitter and managed under the same traffic identifier and which, in response to the reception of the data, acknowledges the transmission of the data for the data transmitter, the apparatus according to an aspect of the present invention includes:

a plurality of management units each of which holds acknowledgement information to acknowledge the transmission for each of the items of data; and a decision unit which, when the data is newly received, causes any one of the management units whose information amount of the acknowledgement information already held is smaller not only to discard the acknowledgement information but also to hold the acknowledgement information on the newly received data.

A wireless communication method according to an aspect of the invention includes:

receiving data which needs acknowledgement of transmission;

determining whether there is any empty one in a plurality of management units capable of holding acknowledgement information for acknowledging the transmission of the data;

if there is no empty management unit, searching for one of the management units which holds the acknowledgement information with the smallest information amount;

causing the empty one of the management units determined to hold the acknowledgement information with the smallest information amount as a result of the search to discard the acknowledgement information; and causing the empty one of the management unit caused to discard the acknowledgement information to hold the acknowledgement information on the received data.

BRIEF DESCRIPTION OF THE SEVERAL VIEWS OF THE DRAWING

FIG. 8 is a conceptual diagram showing the configuration of a data frame transmitted in a wireless communication system according to the first to fourth embodiments of the invention;

FIG. 9 is a conceptual diagram showing the configuration of a BAR frame transmitted in a wireless communication system according to the first to fourth embodiments of the invention;

FIG. 11 schematically shows a management table held in the wireless LAN access point according to the second embodiment;

DETAILED DESCRIPTION OF THE INVENTION

First Embodiment

Figure 1:
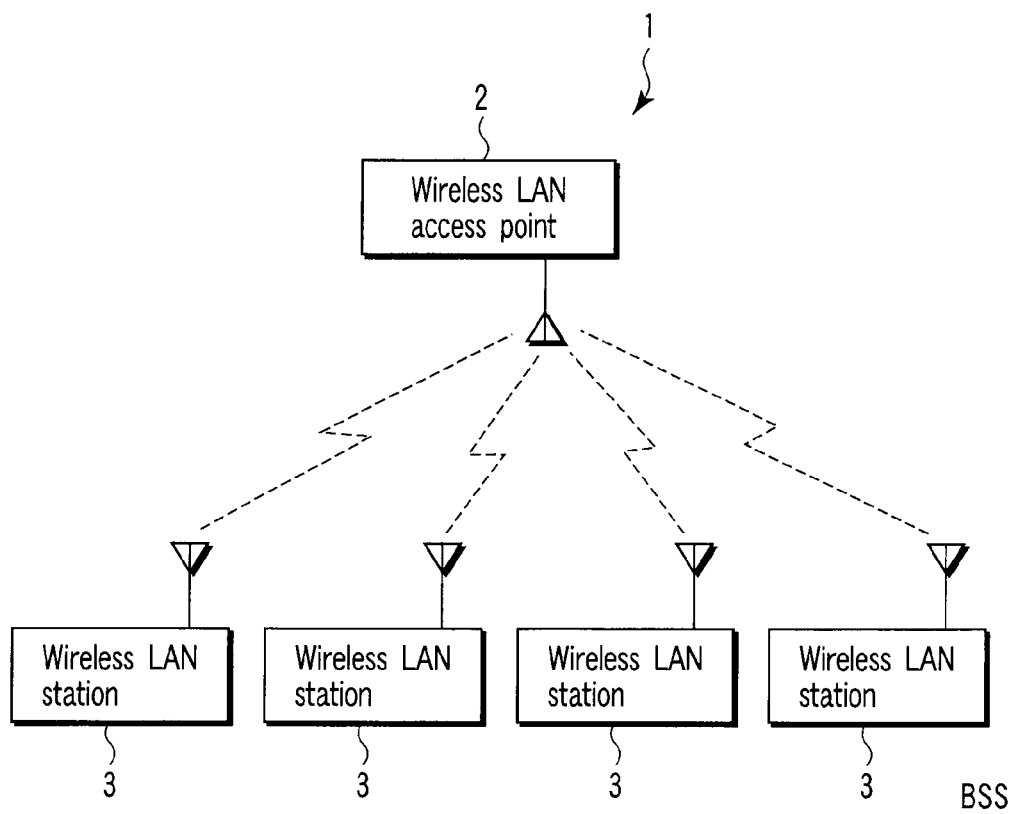
FIG. 1 is a block diagram of a wireless communication system according to a first embodiment of the invention.

A wireless communication apparatus and a wireless communication method according to a first embodiment of the invention will be explained using FIG. 1. FIG. 1 is a block diagram of a wireless communication system according to the first embodiment.

As shown in FIG. 1, a wireless communication system 1 includes a wireless LAN access point (base station) 2 and a plurality of wireless LAN stations (terminal) 3. Using these component parts, the wireless communication system configures a communication network (LAN). The wireless LAN stations 3 communicate with the wireless LAN access point 2. The wireless LAN access point 2 accommodates the wireless LAN stations 3, forming a Basic Service Set (BSS). The wireless LAN access point 2 is connected to a server (not shown) via, for example, a wired LAN, or to the Internet via an Internet service provider through a metal line, optical fiber, or the like.

Figure 2:
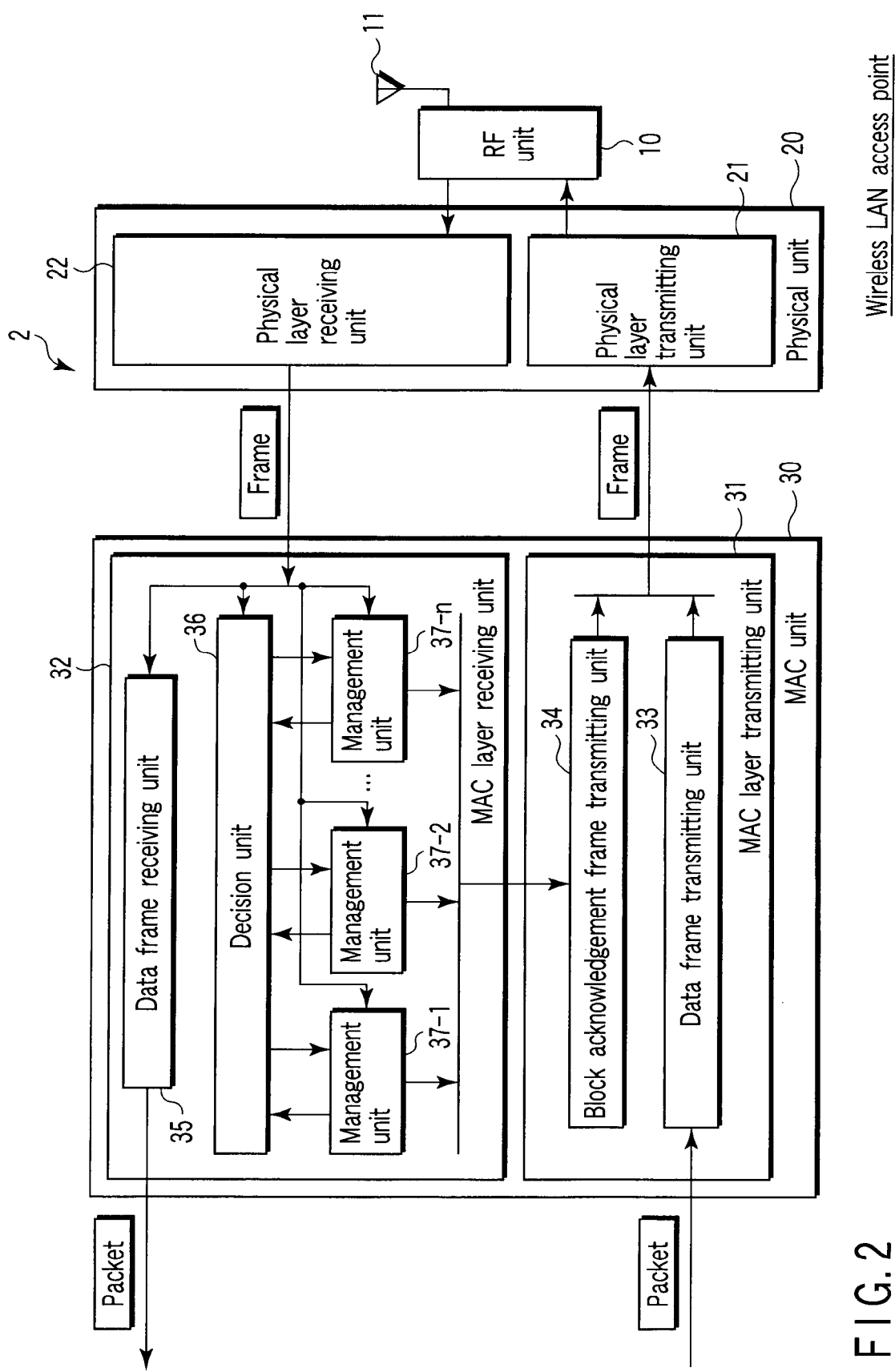
FIG. 2 is a block diagram of a wireless LAN access point according to the first embodiment.

Next, the configuration of the wireless LAN access point 2 will be explained using FIG. 2. FIG. 2 is a block diagram of the wireless LAN access point 2. As shown in FIG. 2, the wireless LAN access point 2 basically includes a radio-frequency (RF) unit 10, a physical unit 20, and a media access control (MAC) unit 30. The RF unit 10 amplifies data on the analog signal to be transmitted or received by wireless communication and transmits or receives data via an antenna 11. The physical unit 20 and MAC unit 30 receive data downloaded from a server or the Internet to be transmitted to the wireless LAN station 3 (hereinafter, referred to as transmit data) from an interface unit (not shown), perform the signal processing of the data, and output the result to the RF unit 10. Moreover, the physical unit 20 and MAC unit 30 perform the signal processing of the data received from the wireless LAN station 3 and output the result to the interface unit. Hereinafter, the physical unit 20 and MAC unit 30 will be explained in detail.

Hereinafter, transmitted and received data on the wireless LAN station 3 side of the MAC unit 30 is referred to as a "frame" and transmitted and receive data on the interface side of the MAC unit 30 is referred to as a "packet". A packet is such that transmitted data and received data are built into a data structure that can be dealt with on a personal computer or the like. A frame is such that transmitted and received data are built into a structure that can be communicated wirelessly. Hereinafter, a net frame to be transmitted or received is referred to as a data frame. A data frame basically includes a MAC header and a frame body which is net data.

The configuration of the physical unit 20 will be explained. The physical unit 20 includes a physical layer transmitting unit 21 and a physical layer receiving unit 22. The physical layer transmitting unit 21 and physical layer receiving unit 22 carry out a transmission and reception process of the physical layers of frames to be transmitted or received. Specifically, the physical layer transmitting unit 21 subjects the frame supplied from the MAC unit 30 to redundant coding and then subjects the result to orthogonal frequency division multiplexing (OFDM) modulation, thereby obtaining a baseband signal. Moreover, the physical layer transmitting unit 21 digital-to-analog converts the baseband transmission signal, thereby obtaining an analog signal. The physical layer receiving unit 22 carries out the opposite process of the received frame. That is, the physical layer receiving unit 22 digitizes the received analog signal and subjects the resulting signal to OFDM demodulation and error-correcting decoding, thereby obtaining a frame.

Next, the MAC unit 30 will be explained. The MAC unit 30 basically includes a MAC layer transmitting unit 31 and a MAC layer receiving unit 32. First, the MAC layer transmitting unit 31 will be explained.

As shown in FIG. 2, the MAC layer transmitting unit 31 includes a data frame transmitting unit 33 and a block acknowledgement frame transmitting unit 34. The data frame transmitting unit 33 receives a packet from the interface unit (not shown). Then, the data frame transmitting unit 33 adds a MAC header to the packet to build a frame and outputs the frame to the physical layer transmitting unit 21 of the physical unit 20. According to the signal supplied from the MAC layer receiving unit 32, the block acknowledgement frame transmitting unit 34 creates a frame for block acknowledgement (which is referred to as a block acknowledgement frame) and outputs the frame to the physical layer transmitting unit 21 of the physical unit 20. Hereinafter, the block acknowledgement frame may be referred to as a BA frame and the block acknowledgement frame transmitting unit 34 may be referred to as a BA frame transmitting unit 34.

Block acknowledgement means acknowledgement made when data is transmitted from any one of the wireless LAN stations 3. It means informing the wireless LAN station 3 whether the data has been received properly at the wireless LAN access point 2. In block acknowledgement, the delivery of data which includes a plurality of data frames and is managed with the same traffic ID is confirmed using one BA frame. Accordingly, the BA frame transmitting unit 34 receives information that shows which frame was received properly at the MAC layer receiving unit 32, or which frame was not received properly at the unit 32 from the unit 32. The BA frame transmitting unit 34 creates a BA frame based on the information. The traffic ID is an identifier which manages one item of data including a plurality of data frames transmitted in a lump. Hereinafter, a set of data frames transmitted from the same wireless LAN station 3 and managed under the same ID is referred to as "data". A plurality of data frames included in certain "data" may be transmitted in a lump or separately at intervals of time.

Next, the MAC layer receiving unit 32 will be explained. The MAC layer receiving unit 32 includes a data frame receiving unit 35, a decision unit 36, and a plurality of management units 37-1 to 37-n (n is a natural number equal to or larger than 2). Hereinafter, the management units 37-1 to 37-n are collectively referred to as the management unit 37 unless the n number of management units have to be distinguished from one another.

The data frame receiving unit 35 receives a frame from the physical layer receiving unit 22 of the physical unit 20. Then, the data frame receiving unit 35 removes the MAC header from the frame, assembles a packet, and outputs the packet to the interface unit.

Each of the plurality of management units 37 holds acknowledgement information about any one of the received frames. Acknowledgement information is information as to which data frame has been received properly and which data frame has not been received properly.

When receiving a frame from the physical layer receiving section 22, the decision unit 36 determines which one of the management units 37 is caused to hold acknowledgement information on the frame and manages the data transmitter (the wireless LAN station 3) of acknowledgement information held in each of the management units 37 and the traffic ID. Moreover, the decision unit 36 instructs any one of the management units 37 to discard and overwrite the held acknowledgement information as needed. That is, when an n number of management units 37 are provided, acknowledgement information on an n number of frames can be held at the same time. However, when a new frame has been further received, any one of the management units 37 has to be set free by discarding the acknowledgement information held until then. Thus, on the basis of the data amount of acknowledgement information held in the management unit 37, the management unit 36 generates an acknowledgement information discard instruction.

Figure 3:
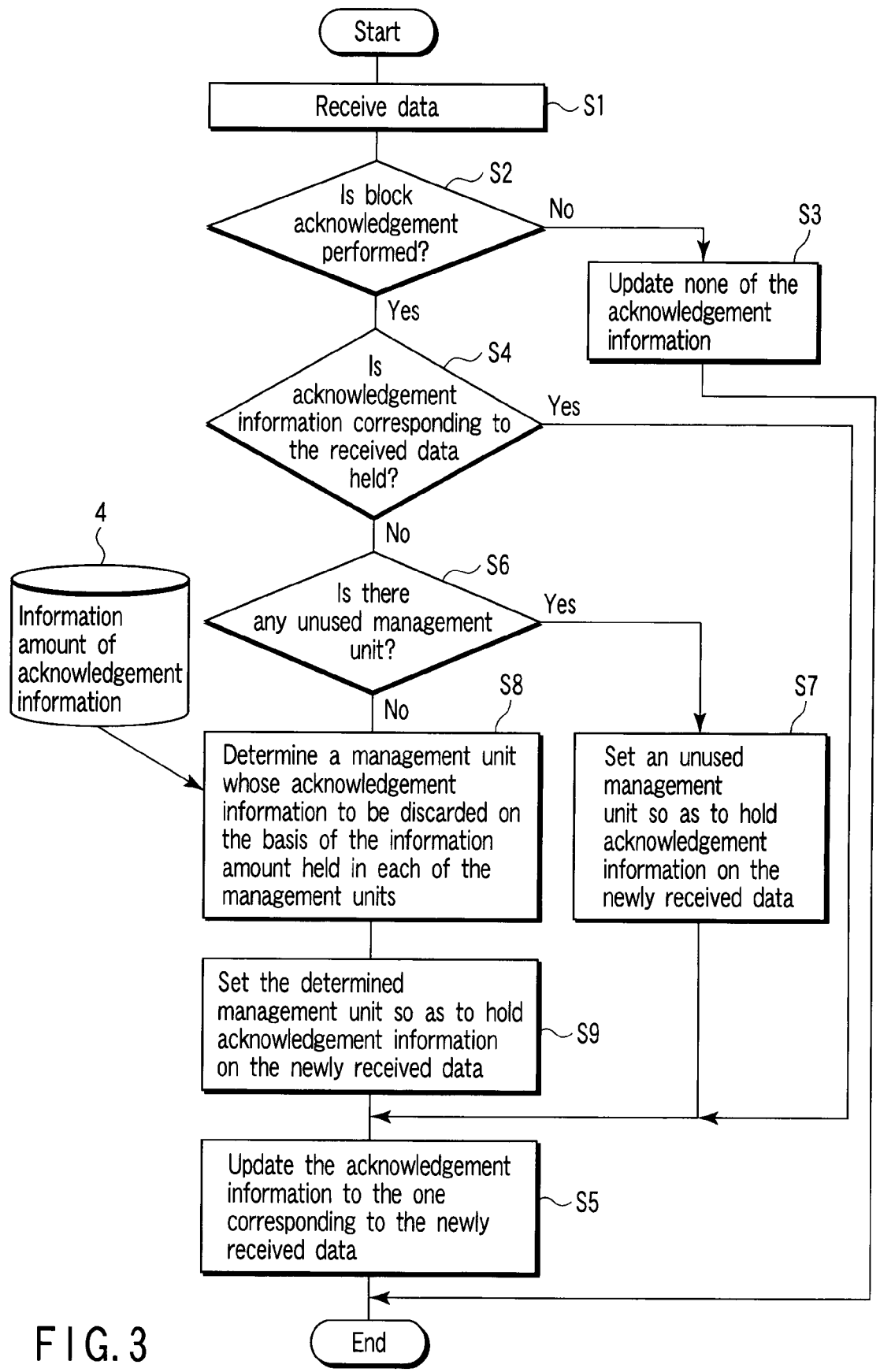
FIG. 3 is a flowchart to help explain the operation of a wireless communication access point according to the first embodiment.

Next, the operation of the wireless LAN access point 2 configured as described above will be explained, focusing attention on a method of updating acknowledge information when data is received from a wireless LAN station 3. FIG. 3 is a flowchart to help explain the operation of the wireless LAN access point 2 according to the first embodiment.

As shown in FIG. 3, when receiving data (frames) (step S1), the wireless LAN access point 2 determines whether the data is for acknowledging the delivery of data with a block acknowledgement mechanism. The determination can be made by the data frame receiving unit 35 or decision unit 36. This is because there is an ordinary acknowledgement mechanism which responds to one data frame with one BA frame in addition to the block acknowledgement mechanism. That is, the data is not limited to data using only the block acknowledgement mechanism. Usually, the block acknowledgement mechanism is used after a negotiation has been conducted with the wireless LAN station 3. Therefore, the wireless LAN access point 2 can determine which data is to be dealt with by the block acknowledgement mechanism through the negotiation. For this reason, first, the wireless LAN access point 2 determines whether the received frame is block acknowledgement mechanism object data.

If the received frame is not block acknowledgement mechanism object data (NO in step S2), the wireless LAN access point 2 updates none of the acknowledgement information held in each of the management units 37 and terminates the process (step S3). If the received frame is block acknowledgement mechanism object data (YES in step S2), the wireless LAN access point 2 determines that the received frame is object data for updating the acknowledgement information in any one of the management units 37.

In that case, the decision unit 36 confirms whether any one of the management units 37 presently holds acknowledgement information corresponding to the received data. Whether the acknowledgement information held in the management unit 37 corresponds to the received data is determined by checking the data transmitter address in the MAC header and the traffic ID in the same MAC header. The data transmitter address is information indicating the wireless LAN station 3 which has transmitted the data.

If any one of the management units 37 holds acknowledgement information (YES in step S4), the management unit 37 updates the acknowledgement information corresponding to the received data (step S5). Conversely, if none of the management units 37 hold the corresponding acknowledgement information (NO in step S4), a check is made to see if unused ones of the management unit 37 are left.

If there are unused management units 37 left (YES in step S6), the decision unit 36 does setting so as to cause any one of the unused management units to hold acknowledgement information corresponding to the newly received data (step S7). Then, in the unused management units 37, the acknowledgement information corresponding to the received data is updated (step S5).

Conversely, if there is no unused management unit 37 left (NO in step S6), the decision unit determines, in order to secure the management unit 37 to hold the acknowledgement information corresponding to the newly received data, any one of the management units 37 which discards the acknowledgement information now held in it (step S8). In this case, according to the information amount 4 of acknowledge information, the decision unit 36 determines a management unit 37 which has to discard the acknowledgement information.

The information amount 4 is specifically as follows. Acknowledgement information is information indicating whether each of a plurality of data frames included in an item of data (i.e., a set of a plurality of data frames transmitted by the same wireless LAN station 3 and managed under the same traffic ID) has been received properly. The data size of the information is the information amount 4 of acknowledgement information. Therefore, the larger the number of data frames included in the data, the larger the information amount 4 of acknowledgement information.

Then, the decision unit 36 instructs the management unit 37 determined in step S8 to discard the presently held information. At the same time, the decision unit 36 sets again the management unit 37 determined in step S8 so that the management unit 37 can hold acknowledgement information corresponding to the newly received data (step S9). Then, the management unit 37 updates the acknowledgement information corresponding to the received data (step S5).

As described above, the wireless communication system according to the first embodiment produces the effect in item (1) below.

(1) The data transmitting efficiency in the wireless communication system can be improved (part 1).

With the configuration of the first embodiment, the wireless LAN access point 2 includes a plurality of management units 37 and a decision unit 36 which determines which one of the management units 37 is caused to discard acknowledgement information. The decision unit 36 causes acknowledgement information whose information amount is smaller to be discarded preferentially. As a result, a wasteful retransmission of frames is suppressed and therefore the throughput of the wireless communication system can be improved. This effect will be explained in detail in comparison with a case where the information amount 4 is not taken into account.

Figure 4:
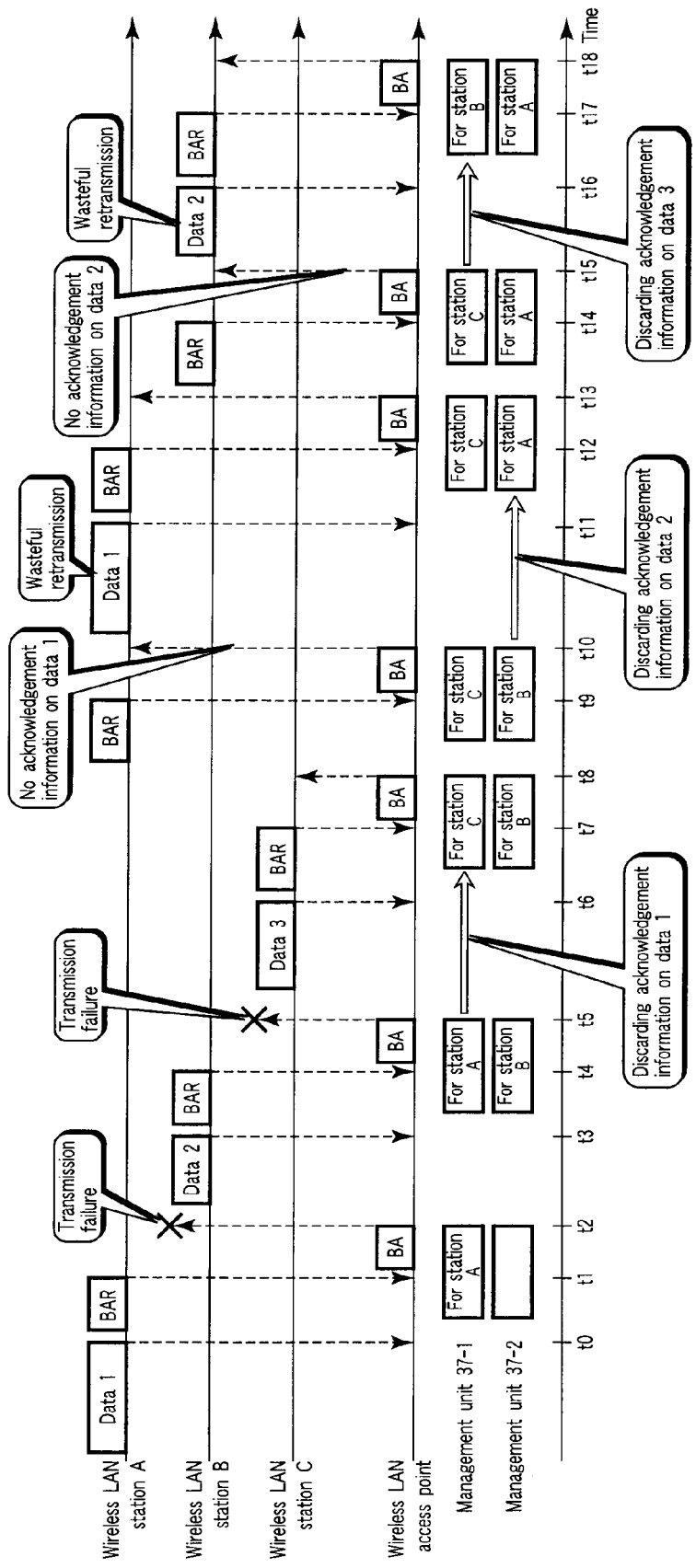
FIG. 4 is a timing chart to help explain the operation of a wireless LAN station and the wireless LAN access point in the wireless communication system.

First, a case where the information amount 4 is not taken into account will be explained using FIG. 4. FIG. 4 is a timing chart to help explain the operation of each of the wireless LAN stations 3 and that of the wireless LAN access point 2 and the state of the management units 37, with the abscissa indicating time. To simplify the explanation, suppose the number of wireless LAN stations 3 is 3, wireless LAN stations A, B, and C, and the number of management units 37 is 2, management units 37-1 and 37-2. FIG. 4 further shows a case where pieces of the acknowledgement information are discarded on a least recently-updated basis. The idea of this method is the same as that of a cache usually used in the CPU or the like.

As shown in FIG. 4, suppose the wireless LAN access point 2 receives data 1 transmitted from wireless LAN station A at time t0. Here, "data" is a set of data frames transmitted by the same wireless LAN station 3 and managed under the same traffic ID, each of the data frames including a MAC header and a frame body. Then, the management unit 37-1 holds acknowledgement information on data 1. At time t1, the wireless LAN access point 2 receives a block acknowledgement request frame transmitted from wireless LAN station A. The block acknowledgement request frame is a frame transmitted to the wireless LAN access point 2 to request the block acknowledge. Hereinafter, the block acknowledgement request frame may be referred to as a BAR (Block Acknowledge Request) frame.

In response to the BAR frame received at time t1, the wireless LAN access point 2 creates a BA frame using the acknowledgement information held in the management unit 37-1 at time t2 and transmits the BA frame to wireless LAN station A. Suppose the transmission of the BA frame has failed because of the situation of the transmission path or the like. That is, suppose information as to whether the wireless LAN access point 2 has received data 1 properly has not reached wireless LAN station A.

Then, suppose the wireless LAN access point 2 receives data 2 transmitted from wireless LAN station B at time t3. Let data 1 be larger than data 2 in data amount. The data amount is represented by the period of transmission in transmitting data, in figure. An unused management unit 37-2 holds acknowledgement information on data 2. At time t4, the wireless LAN access point 2 receives a BAR frame transmitted from wireless LAN station B.

In response to the BAR frame received at time t4, the wireless LAN access point 2 creates a BA frame using the acknowledgement information held in the management unit 37-2 at time t5 and transmits the BA frame to wireless LAN station B. Suppose the transmission of the BA frame has also failed.

Next, suppose the wireless LAN access point 2 receives data 3 transmitted from wireless LAN station C at time t6. Then, of the management units 37-1 and 37-2, the management unit 37-1 which updated the acknowledgement information earlier is set for wireless LAN station C. Accordingly, the management unit 37-1 discards the acknowledgement information on data 1 and updates the old one to acknowledgement information on data 3. At time t7, the wireless LAN access point 2 receives a BAR frame transmitted form wireless LAN station C.

In response to the BAR frame received at time t7, the wireless LAN access point 2 creates a BA frame using the acknowledgement information held in the management unit 37-1 at time t8 and transmits the BA frame to wireless LAN station B. Suppose the transmission of the BA frame has succeeded. This enables wireless LAN station C to grasp whether data 3 has been transmitted properly.

Next, at time t9, the wireless LAN access point 2 receives the BAR frame transmitted from wireless LAN station A. The BAR has been transmitted again to make a request for the block acknowledgement, since wireless LAN station A has not received acknowledgement information because the transmission of the BA frame failed at time t2. At this point, acknowledgement information on data 1 has been stored in neither the management unit 37-1 nor the management unit 37-2. This is because acknowledgement information on data 1 has been discarded when data 3 is received. Then, the wireless LAN access point 2 transmits a BA frame including information as to data 1 has not been received to wireless LAN station A at time t10.

Accordingly, wireless LAN station A tries to transmit data 1 again. This is a wasteful retransmission. Specifically, even if data 1 has been received properly by the wireless LAN access point 2, its acknowledgement information has not been held in the management units 37-1, 37-2 and therefore data 1 is retransmitted. Then, acknowledgement information on data 1 is held in the management unit 37-2. That is, the acknowledgement information on data 2 held until then in the management unit 37-2 is discarded.

Next, at time t14, the wireless LAN access point 2 receives the BAR frame transmitted from wireless LAN station B. Since the wireless LAN access point 2 has failed to transmit the BA frame at time t5, wireless LAN station B transmits the BAR frame because having received no acknowledgement information. Then, at this point in time, acknowledgement information on data 2 has been held in neither the management unit 37-1 nor the management unit 37-2. The reason is that acknowledgement information on data 2 is discarded when the retransmitted data 1 is received again. Thus, at time t15, the wireless LAN access point 2 transmits a BA frame including information that data 2 has not been received to wireless LAN station B. Accordingly, wireless LAN station B tries to retransmit data 2. This is a wasteful retransmission as described in data 1.

As described above, with the method of simply discarding data in the order of update time without taking the information amount of acknowledgement information into account, a large amount of data and a small amount of data are all retransmitted under the same conditions. That is, when a large amount of data is retransmitted, the transmission time has to be longer accordingly, occupying the transmission path wastefully, which causes the problem of decreasing the use efficiency of the transmission path.

Figure 5:
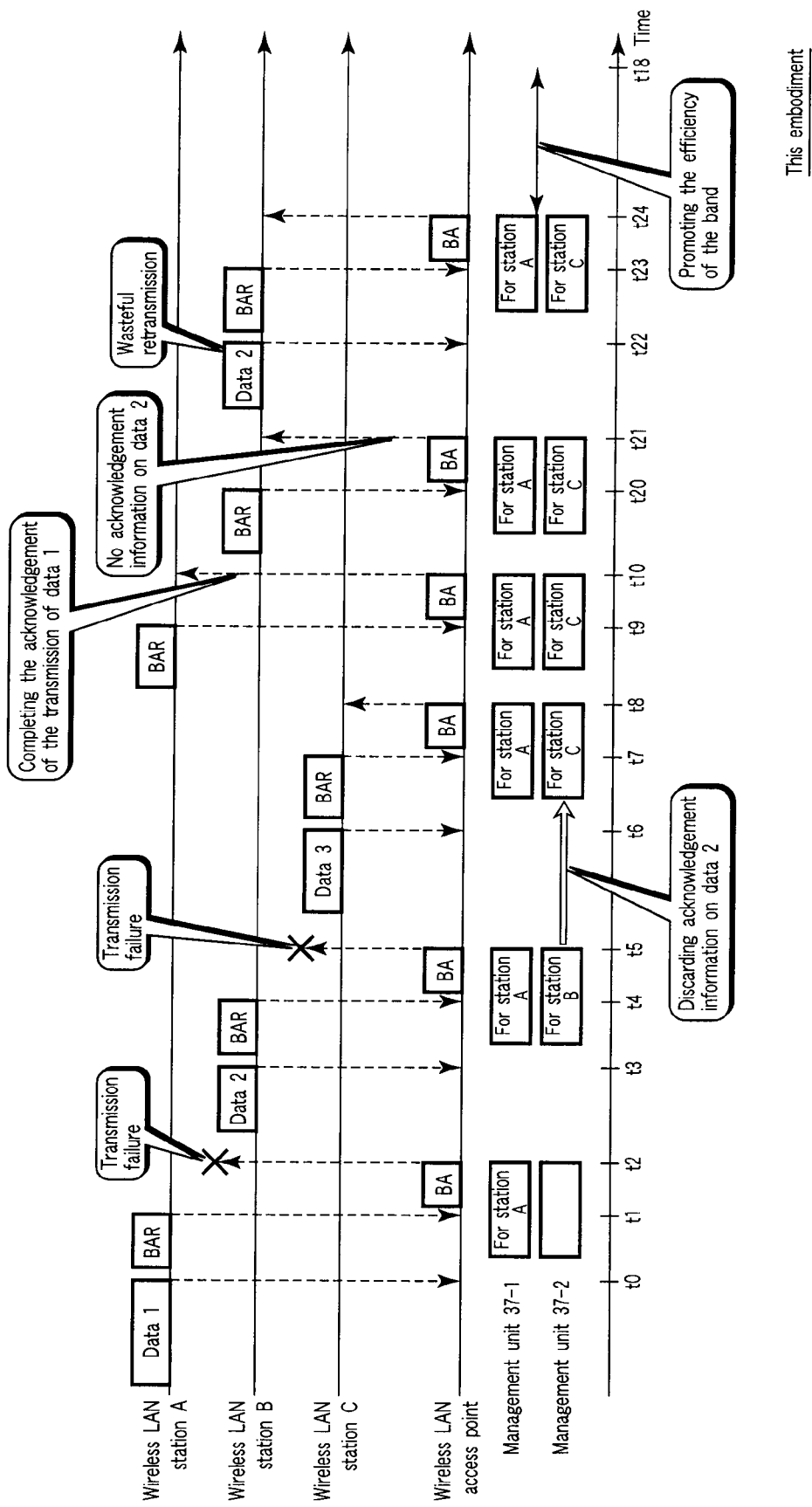
FIG. 5 is a timing chart to help explain the operation of a wireless LAN station and the wireless LAN access point in the wireless communication system according to the first embodiment.

In this respect, with the method of the first embodiment, attention is focused on the information amount of acknowledgement information and a piece of acknowledgement information whose information amount is smaller is discarded preferentially. Accordingly, a wasteful occupation of the transmission path is suppressed, enabling the use efficiency to be improved. This effect will be explained using FIG. 5. Like FIG. 4, FIG. 5 is a timing chart to help explain the operation of each of the wireless LAN stations 3 and that of the wireless LAN access point 2 and the state of the management units 37, with the abscissa indicating time. As in FIG. 4, suppose the number of wireless LAN stations 3 is 3, wireless LAN stations A, B, and C, and the number of management units 37 is 2, management units 37-1 and 37-2. FIG. 5 shows a case where data 1 to data 3 are transmitted with the same timing as in FIG. 4.

As shown in FIG. 5, the operations up to time t5 are the same as in FIG. 4. FIG. 5 differs from FIG. 4 in that, first at time t6 when data 3 is received, the management unit 37-2, not the management unit 37-1, is set for wireless LAN station C. That is, the decision unit 36 compares the information amount of acknowledgement information in the management unit 37-1 with that in the management unit 37-2. Since data 1>data 2 in data amount, the information amount in the management unit 37-1 is larger than that in the management unit 37-2. Accordingly, the decision unit 36 instructs the management unit 37-2 to discard the acknowledgement information and to update the old information to acknowledgement information on data 3.

Then, at time t9, the wireless LAN access point 2 receives the BAR frame retransmitted from wireless LAN station A. Then, unlike the case of FIG. 4, the management unit 37-1 holds acknowledgement information on data 1 at this point in time. Accordingly, the wireless LAN access point 2 assembles a BA frame using the acknowledgement information in the management unit 37-1 at the BA frame transmitting unit 34 and transmits the BA frame to wireless LAN station A at time t10. As a result, it is unnecessary to retransmit data 1 whose data amount is large.

Moreover, at time t20, the wireless LAN access point 2 receives the BAR frame retransmitted from wireless LAN station B. In this case, since acknowledgement information on data 2 has been held in neither the management unit 37-1 nor the management unit 37-2, data 2 has to be retransmitted.

As described above, with the method of the first embodiment, the larger the data amount, the smaller the number of retransmissions can be made. Specifically, when data exceeding the number of management units 37 has been received, any one piece of acknowledgement information has to be discarded and therefore retransmission is needed. At this time, the larger the amount of data to be retransmitted, the longer the occupation time of the transmission path. Accordingly, if data is retransmitted, it is desirable to select data whose data amount is smaller. Therefore, in the first embodiment, attention is focused on the information amount of acknowledgement information and a piece of acknowledgement information whose information amount is smaller is discarded preferentially. This makes it possible to suppress the retransmission of data whose data amount is large. In the example of FIG. 5, although data 2 has to be retransmitted, the retransmission of data 1 whose data amount is larger than that of data 2 becomes unnecessary. As a result, the period between times t24 and t18 and the occupation time of the transmission path can be shortened as compared with the case of FIG. 4. Consequently, the data transmitting efficiently can be improved.

Second Embodiment

Figure 6:
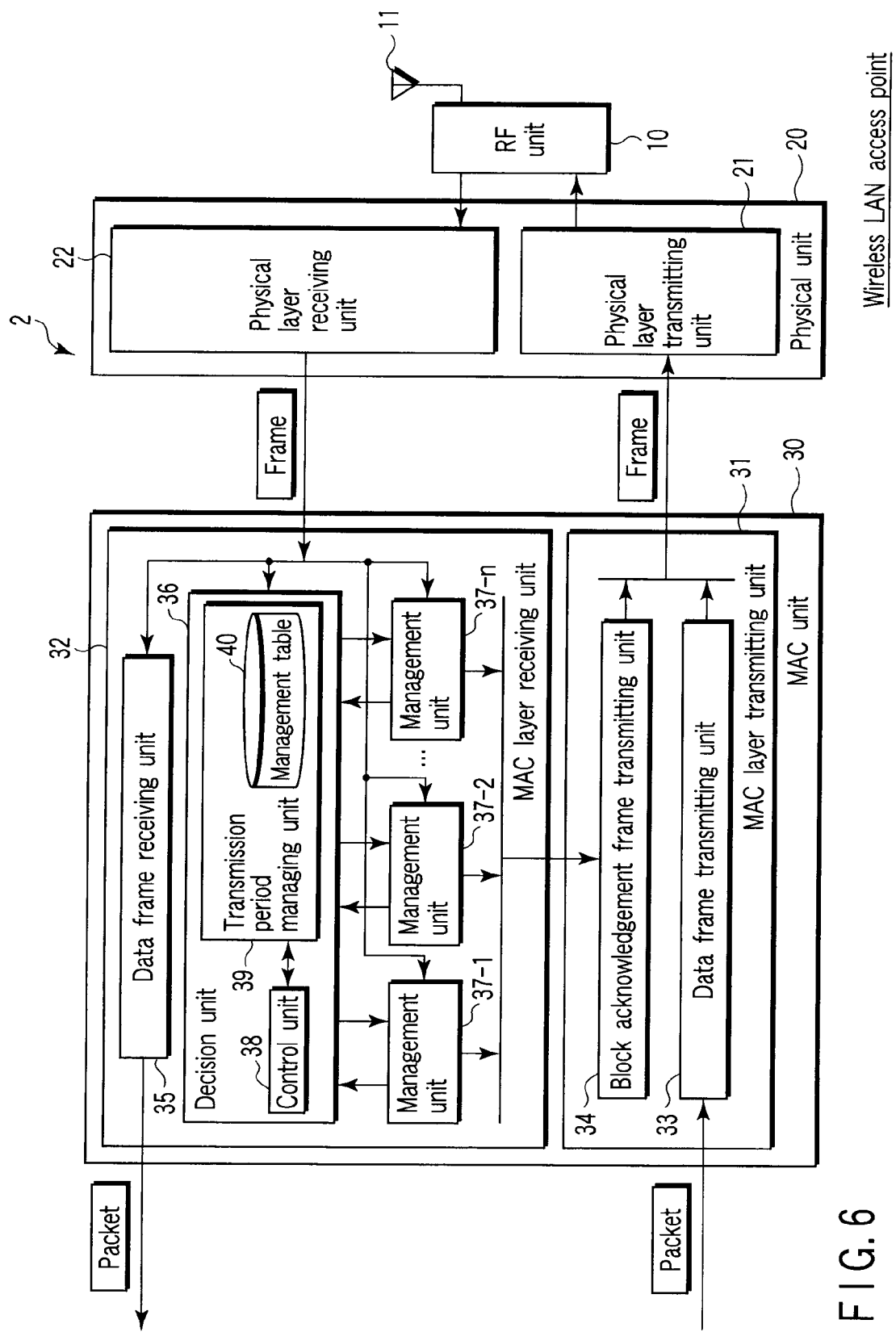
FIG. 6 is a block diagram of a wireless LAN access point according to a second embodiment of the invention.

Next, a wireless communication apparatus and a wireless communication method according to a second embodiment of the invention will be explained. The second embodiment relates to a method of determining the size of the information amount of acknowledgement information in the first embodiment, and more particularly to a method of determining the size of the information amount on the basis of the length of a continuous transmission possible period. FIG. 6 is a block diagram of a wireless LAN access point 2 according to the second embodiment.

As shown in FIG. 6, the wireless LAN access point 2 of the second embodiment is such that a decision unit 36 includes a control unit 38 and a transmission period managing unit 39 in the configuration of FIG. 2 explained in the first embodiment.

Figure 7:
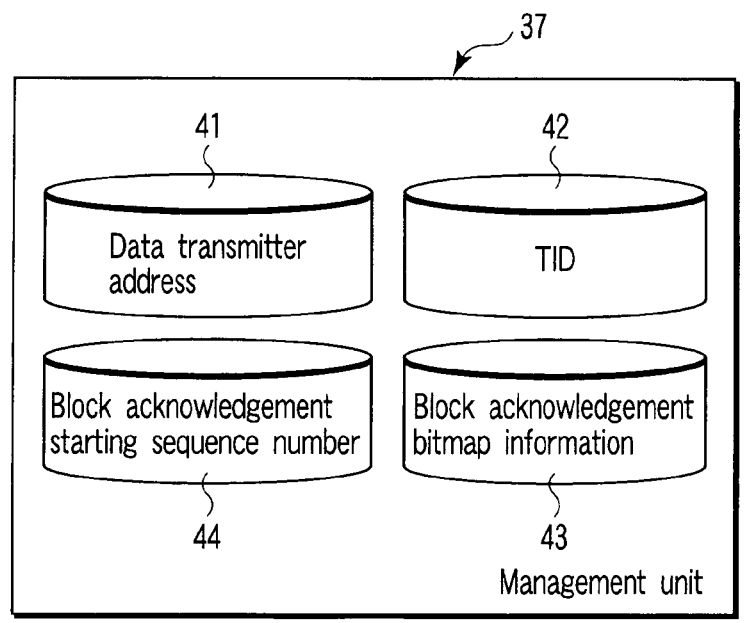
FIG. 7 is a block diagram of a management unit in a wireless LAN access point according to the first and second embodiments and a third and a fourth embodiment of the invention, showing the contents of acknowledgement information.

Here, acknowledgement information held in a management unit 37 will be explained using FIG. 7. FIG. 7 is a block diagram of the management unit 37, particularly showing data held as acknowledgement information. As shown in FIG. 7, the management unit 37 holds a data transmitter address 41, a traffic ID 42 (referred to as TID in the figure), block acknowledgement bitmap information 43, and a block acknowledgement starting sequence number 44 as acknowledgement information. Acknowledgement information held in a management unit 37 is information on the data transmitted from any one of the wireless LAN stations 3 and managed under one traffic ID. The configuration of acknowledgement information held in the management unit 37 is common to not only the second embodiment but also all the other embodiments of the invention including the first embodiment.

As explained in the first embodiment, the data transmitter address 41 is information indicating a wireless LAN station 3 which has transmitted the data. Specifically, addresses have been allocated to the individual wireless LAN stations 3 in the BSS configured by the wireless LAN access point 2. The addresses are the data transmitter addresses 41. On the basis of the data transmitter addresses 41, it can be determined which one of the wireless LAN stations 3 has transmitted the data.

As explained in the first embodiment, the traffic ID 42 is an identifier for managing a plurality of data frames transmitted in a lump from a certain wireless LAN station 3. That is, when a plurality of items of data have been transmitted from the same wireless LAN station 3, each piece of data can be determined using the traffic ID 42.

The block acknowledgement bitmap information 43 is information indicating whether the wireless LAN station 2 has properly received a plurality of data frames included in a piece of data.

The block acknowledgement starting sequence number 44 is as follows. Frame numbers ranging from 0 to 4095 have been allocated to the data frames and are called sequence numbers. The block acknowledgement starting sequence number 44 indicates that the block acknowledgement bitmap information has information on the data frames corresponding to the sequence numbers of a specific area. Therefore, for example, if the block acknowledgement starting sequence number 44 is "5", it is seen that the block acknowledgement bitmap information is information on the data frames whose sequence numbers are "5", "6", "7", . . .

Next, data transmitted from the wireless LAN station 3 will be explained using FIG. 8, which schematically shows the structure of a data frame. As shown in FIG. 8, each of the data frames includes a MAC header and a frame body. As described above, the frame body indicates the contents of net data. The MAC header includes a data transmitter address, a sequence number, and a traffic ID. That is, the wireless LAN access point 2 can know a data transmitter address, a sequence number, and a traffic ID from the MAC header of the data. From these pieces of data, the wireless LAN access point 2 can cause the management unit 37 to hold the data transmitter address 41, traffic ID 42, and block acknowledgement starting sequence number 43 for the data. Since the wireless LAN access point 2 itself gives the transmission right to the wireless LAN station 3, it can know which one of the wireless LAN stations 3 has sent the data when having received the data.

Then, a plurality of data frames configured as described above which are transmitted by the same wireless LAN station 3 and have the same traffic ID are, for example, aggregated and transmitted. Each data frame resulting from one frame aggregation has naturally the same traffic ID but has a different sequence number.

Next, a BAR frame will be explained using FIG. 9, which schematically shows the structure of a BAR frame. As shown in FIG. 9, a BAR frame includes a MAC header, a traffic ID, and a block acknowledgement starting sequence number. Thus, receiving a BAR frame, the wireless LAN access point 2 can know the data transmitter address, traffic ID, and begin frame number of the data frame for the data required by the BAR frame to be checked whether it has been delivered.

Figure 10:
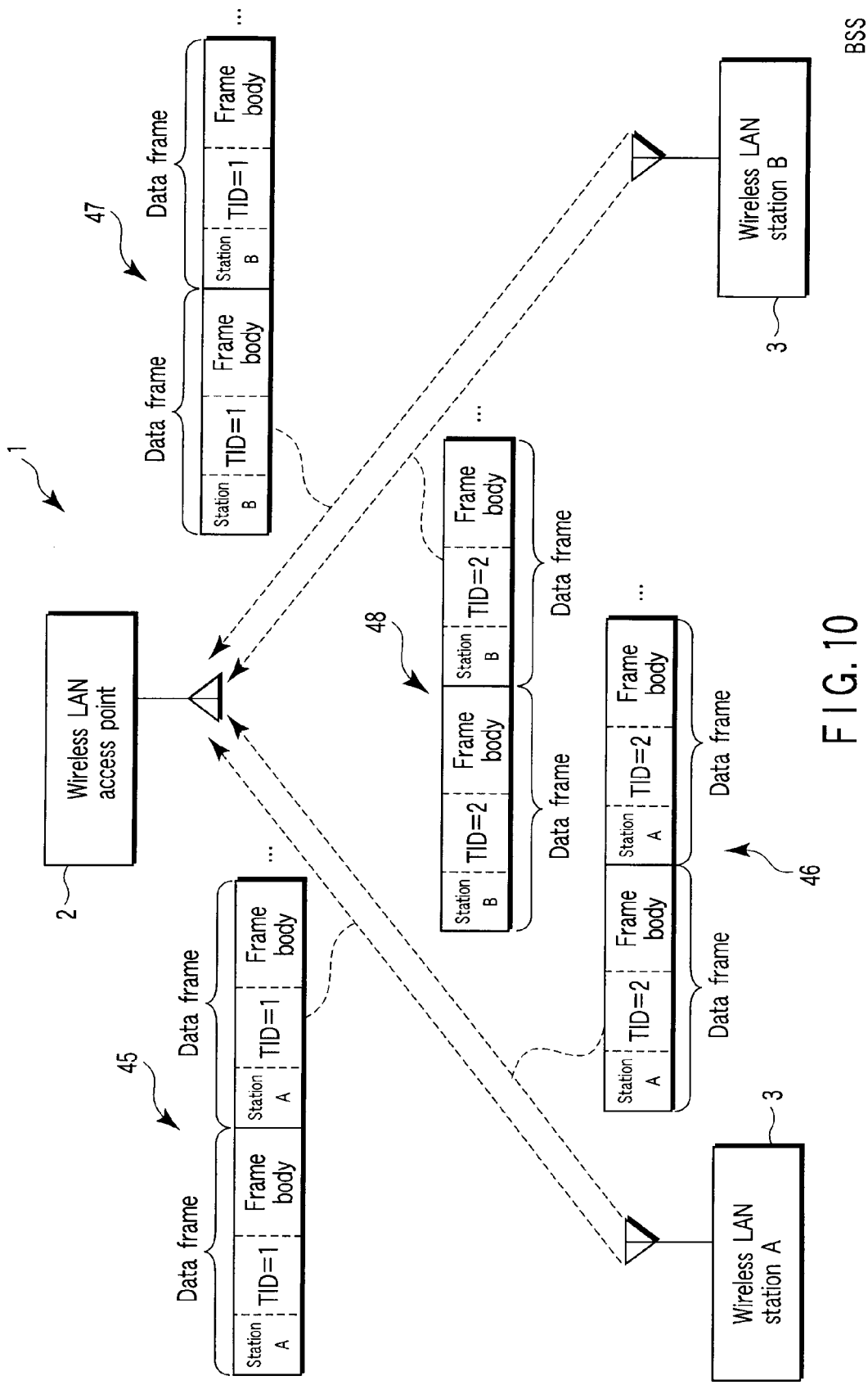
FIG. 10 is a block diagram of a wireless communication system according to the first to fourth embodiments of the invention.

FIG. 10 is a block diagram of a wireless communication system 1. As shown in FIG. 10, for example, suppose wireless LAN station A has transmitted data items 45, 46 and wireless LAN station B has transmitted data items 47, 48. Each of the data items 45 to 48 includes information (data transmitter address) on the wireless LAN station 3 (data transmitter) and the traffic ID. Accordingly, the wireless LAN access point 2 can manage the individual data items 45 to 48 without confusing them or mistaking the data transmitter for each of the data items. The sequence numbers are omitted in FIG. 10.

Next, returning to FIG. 6, the configuration of the decision unit 36 will be explained. The transmission period managing unit 39 holds the length of the continuous transmission possible period held in the wireless LAN station 3 which has transmitted the data in a management table 40 when data on the acknowledgement information held in each of the management units 37 has been transmitted. Here, the continuous transmission possible period will be explained.

The continuous transmission possible period has been defined as TXOP (transmission opportunity) in the IEEE 802.11e standard. It means a period in which the data group can be transmitted consecutively at regular frame intervals without checking the state of the transmission path after having acquired a transmission right. The determination of the continuous transmission possible period differs between two access mechanisms determined in the IEEE 802.11e.

First, an access mechanism known as enhanced distributed channel access (EDCA) will be explained. In this mechanism, data is divided into four levels of priority. A priority level is set to each item of data. To realize the priority levels, the parameter which determines an inter-frame space period and a back-off period before the acquisition of a transmission right is changed on a priority level basis. The continuous transmission possible periods are made different. Using beacon frames, the wireless LAN access point 2 informs the wireless LAN stations 3 accommodated in it of the priority levels.

Accordingly, using the information set by itself, the wireless LAN access point 2 can know the continuous transmission possible period for each priority level. Using the information received via a beacon frame, the wireless LAN station 3 can know the continuous transmission possible period for each priority level. The priority levels correlate with the traffic IDs allocated to the data items. Then, the wireless LAN access point 2 determines priority levels according to the traffic IDs. Accordingly, the transmission period managing unit 39 can know the continuous transmission possible period of the data managed at the management unit 37 from one data transmitter address and one traffic ID held in each of the management units 37.

Next, an access mechanism known as hybrid coordination function controlled channel access (HCCA) will be explained. Using management frames, this mechanism conducts, in advance, a negotiation for a communication band used by the data group to be transmitted. On the basis of the information, the wireless LAN access point 2 actually sets a continuous transmission possible period to the data and gives a transmission right to the data periodically. Data is distinguished using the data transmitter address and traffic ID.

Accordingly, from the continuous transmission possible period managed by itself, the wireless LAN access point 2 can know the continuous transmission possible period. The wireless LAN station 3 can know the continuous transmission possible period from the continuous transmission possible period actually given using management frames. The data structure, BAR frame structure, and access mechanism are also common to all the embodiments in this specification.

By any one of the methods, the wireless LAN access point 2 determines a continuous transmission possible period for each items of data. That is, in the case of EDCA, the wireless LAN access point 2 can know the continuous transmission possible period from the data transmitter address and traffic ID included in the received data. In the case of HCCA, the wireless LAN access point 2 can know the continuous transmission possible period automatically because managing the continuous transmission possible period by itself. FIG. 11 is a conceptual diagram of the management table held in the transmission period managing unit 39. As shown in FIG. 11, the management table 40 holds the lengths of the continuous transmission possible periods TXOP1 to TXOPn in transmitting data items corresponding to the pieces of acknowledgement information held in each of the management units 37-1 to 37-n.

When receiving a frame, the control unit 38 of the decision unit 36 determines which one of the management units 37 is to be caused to hold acknowledgement information on the frame and manages the data transmitter (any one of the wireless LAN stations 3) and traffic ID according to the acknowledgement information held in each of the management units 37. Moreover, the control unit 38 instructs any one of the management units 37 to discard and overwrite the held acknowledgement information. When instructing the discard of acknowledgement information, the control unit 38 refers to the management table held in the transmission period managing unit 39 and determines a management unit 37 caused to discard acknowledgement information on the basis of the length of the continuous transmission possible period.

The remaining configuration and operation are the same as those in the first embodiment, so an explanation of them will be omitted.

Figure 12:
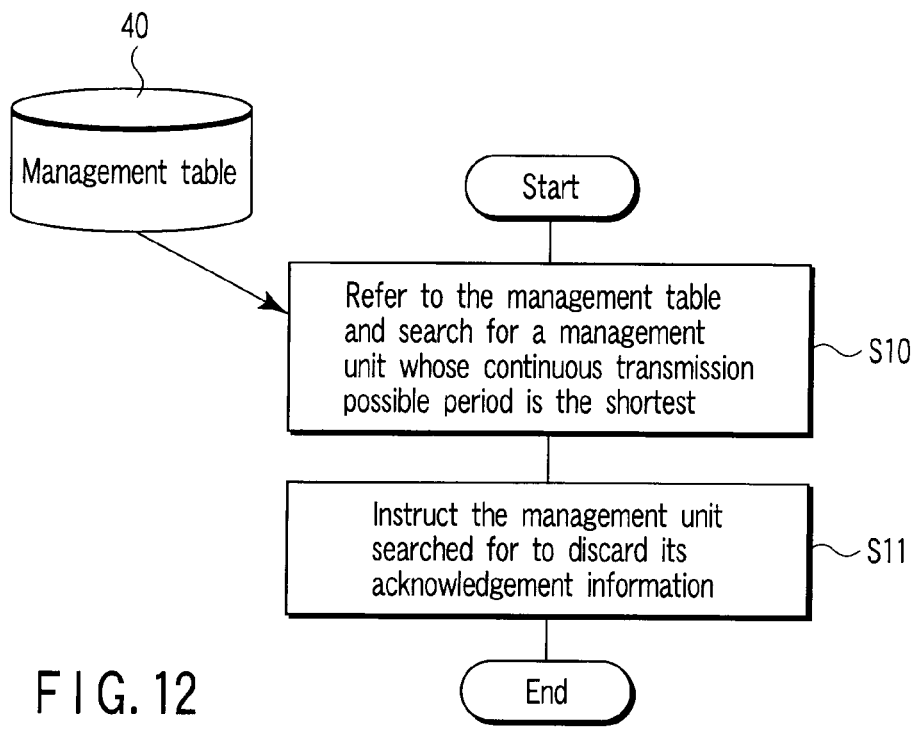
FIG. 12 is a flowchart to help explain the operation of the wireless communication access point according to the second embodiment.

Next, the operation of the wireless LAN access point 2 configured as described above will be explained. The basic operation is the same as in FIG. 3 explained in the first embodiment. The second embodiment relates to the details of step S8 in FIG. 3. FIG. 12 is a flowchart to help explain the contents of step S8.

As shown in FIG. 12, the control unit 38 refers to the management table 39 in the transmission period managing unit 39. Then, the control unit 38 searches for a management unit 37 whose continuous transmission possible period is the shortest in the management table 39 (step S10). That is, in FIG. 11, the control unit 38 searches the management table 39 for one of the management units 37-1 to 37-n which has the shortest one of TXOP1 to TXOPn.

Then, the control unit 38 instructs the management unit 37 searched for as a result of the search in step S10 to discard the acknowledgement information (step S11). Then, in step S7, the management unit 37 whose acknowledgement information was discarded in step S11 is set for new reception.

As described above, the wireless communication system of the second embodiment produces the effect in item (2) below.

(2) The data transmitting efficiency in the wireless communication system can be improved (part 2).

With the configuration of the second embodiment, the decision unit 36 manages the length of a continuous transmission possible period and causes the management unit 37 whose continuous transmission possible period is the shortest to discard its acknowledgement information preferentially. As a result, a wasteful retransmission of frames is suppressed, producing the effect in item (1) explained in the first embodiment. The effect will be explained in detail below.

When the continuous transmission possible period is long, this means that the number of data frames transmitted consecutively until an acknowledgement request and a response are made using a BAR frame and a BA frame is that much large or is more likely to be large. When the number of data frames consecutively transmitted is large, this means that the information amount of acknowledgement information to be delivered to the data transmitter is larger in the held acknowledgement information.

The problem caused as a result of discarding acknowledgement information is a decrease in the band use efficiency due to a subsequent wasteful retransmission of actually received data frames since the acknowledgement information has been discarded before being delivered to the data transmitter. To suppress the decrease of the efficiency, the information amount of necessary information is preferably smaller in the discarded acknowledgement information.

Figure 13:
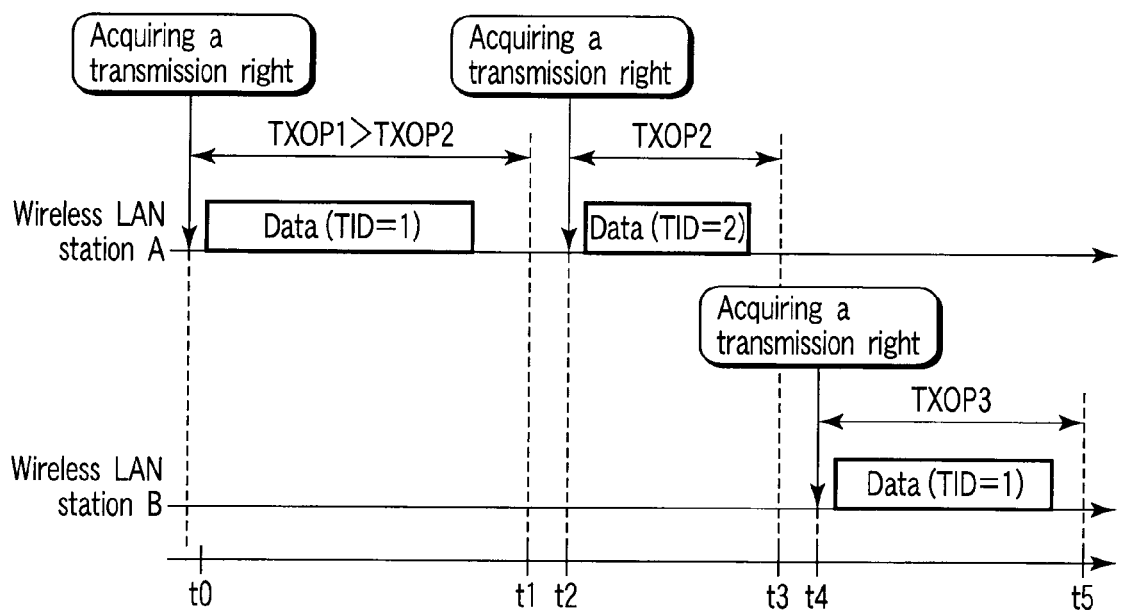
FIG. 13 is a timing chart to help explain the operation of a wireless LAN station in a wireless communication system according to the second embodiment.

Accordingly, as described above, a management unit whose information amount is considered to be larger, that is, a management unit whose continuous transmission possible period is longer, is left preferentially. Conversely, a management unit whose continuous transmission possible period is shorter is discarded, which makes it possible to minimize a decrease in the use efficiency. This will be explained more concretely using FIG. 13, which is a timing chart to help explain the operation of two wireless LAN stations 3 (hereinafter, referred to as wireless LAN stations A and B), with the abscissa indicating time. Suppose the number of management units 37 is 2. In FIG. 13, each data item is a set of a plurality of data frames. The data frames included in the same data item are transmitted from the same wireless LAN station 3 and have the same traffic ID.

First, suppose, at time t0, wireless LAN station A acquires a transmission right and the continuous transmission possible period at that time is TXOP1. During TXOP1, data with traffic ID="1" is transmitted. Then, suppose, at time t2, wireless LAN station A acquires a transmission right and the continuous transmission possible period at that time is TXOP2. During TXOP2, data with traffic ID="2" is transmitted. At this point in time, the two management units 37 have been used.

Next, suppose, at time t4, wireless LAN station B acquires a transmission right and transmits data with traffic ID="1". Then, either of the two management units 37 has to discard the acknowledgement information. The control unit 38 then compares TXOP1 and TXOP2. Since TXOP2 is shorter, the data is transmitted during TXOP2 and the control unit 38 instructs the management unit 37 to discard the acknowledgement information corresponding to data with traffic ID="2".

As shown in FIG. 13, since TXOP1>TXOP2, data transmitted in the period TXOP1 is generally larger in data amount than the data transmitted in the period TXOP2. Of course, there may be a case where the amount of actually transmitted data is small because the transmission path has been hardly used even if the continuous transmission possible period is long. The probability is such that the longer the continuous transmission possible period, the larger the amount of data transmitted. Accordingly, preferentially discarding acknowledgement information whose continuous transmission possible period is shorter enables the amount of data retransmitted to be decreased, which produces the effect explained using FIGS. 4 and 5 in the first embodiment.

Third Embodiment

Figure 14:
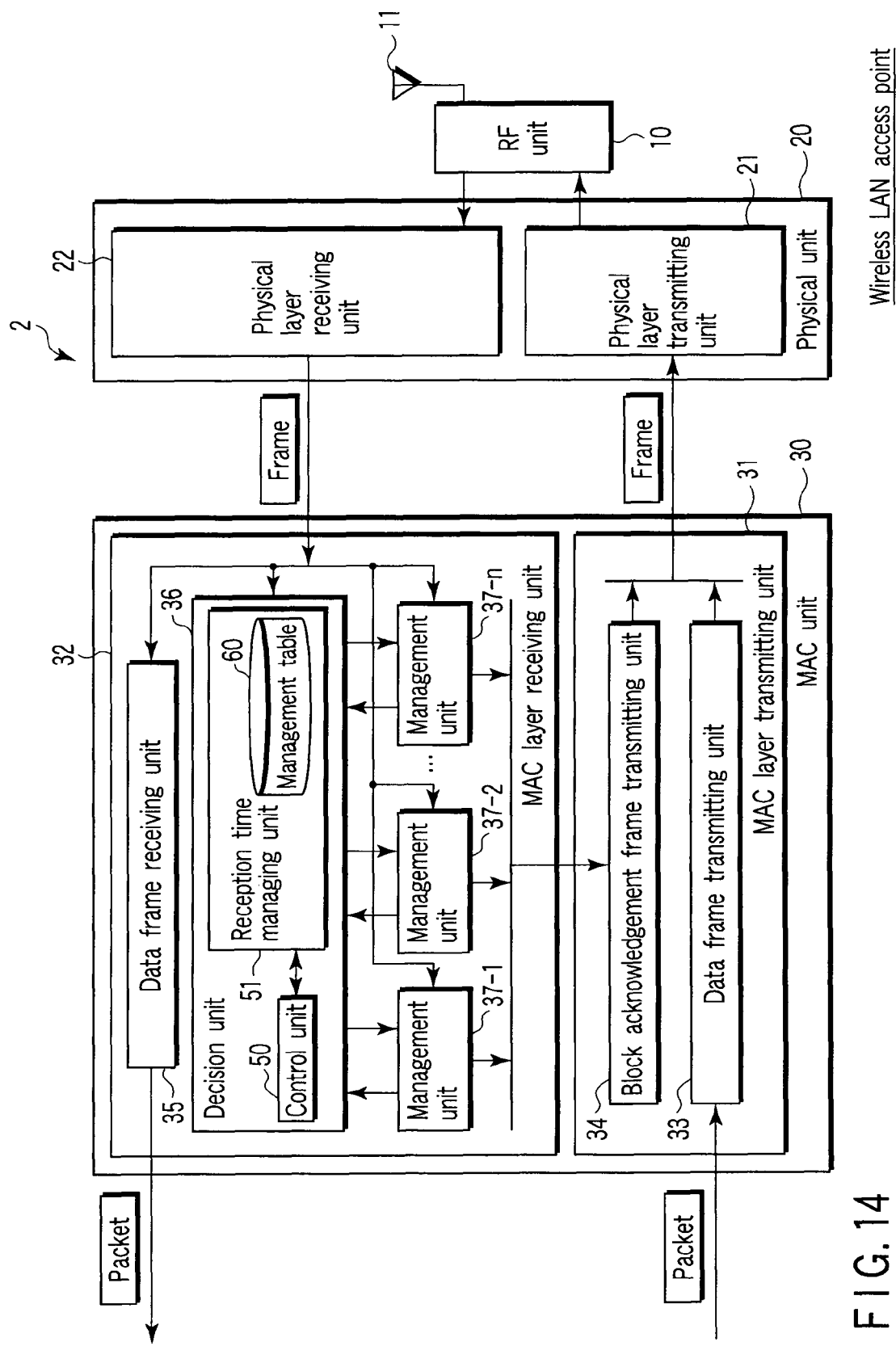
FIG. 14 is a block diagram of a wireless LAN access point according to a third embodiment of the invention.

Next, a wireless communication apparatus and a wireless communication method according to a third embodiment of the invention will be explained. Like the second embodiment, the third embodiment relates to a method of determining the size of the information amount of acknowledgement information. The third embodiment is such that the size of the information amount is determined by the reception time of a BAR frame in place of the length of a continuous transmission possible period. FIG. 14 is a block diagram of a wireless LAN access point 2 according to the third embodiment.

As shown in FIG. 14, the wireless LAN access point 2 of the third embodiment is such that a decision unit 36 includes a control unit 50 and a reception time managing unit 51 in the configuration of FIG. 2 explained in the first embodiment.

Figures 15, 16:
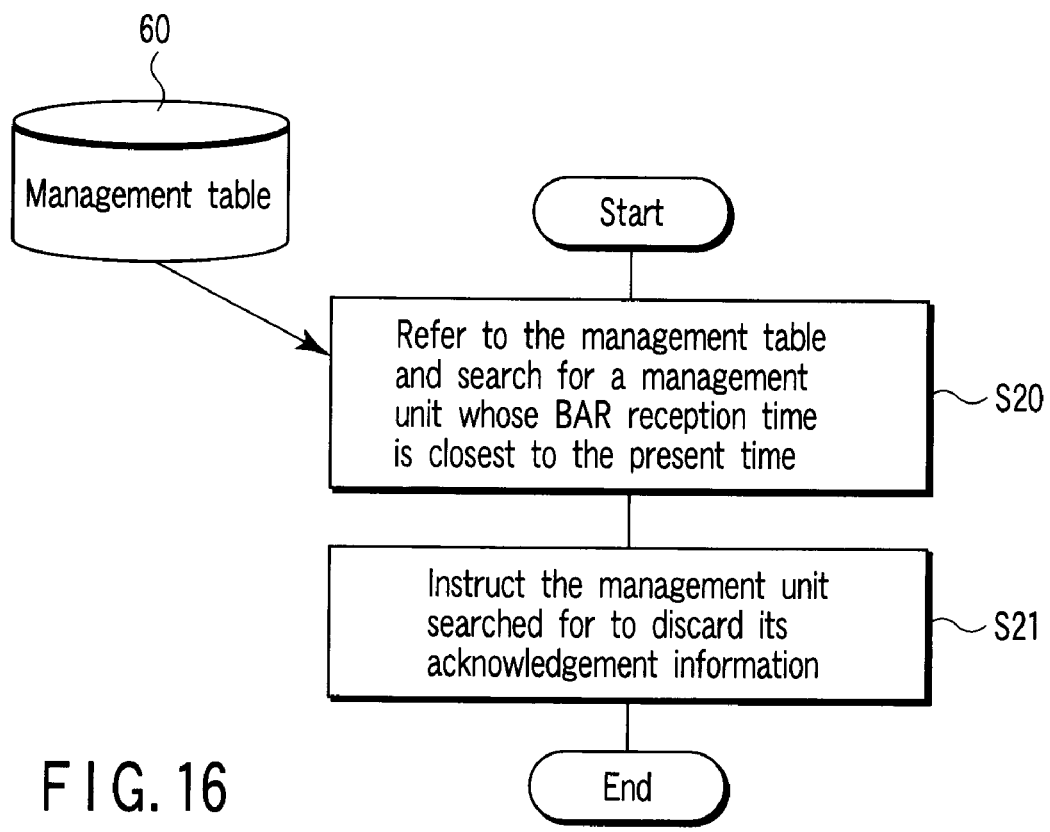
FIG. 15 schematically shows a management table held in the wireless LAN access point according to the third embodiment.
FIG. 16 is a flowchart to help explain the operation of the wireless communication access point according to the third embodiment.

The reception time managing unit 51 holds in a management table 60 the reception times of the BAR frames transmitted according to the data corresponding to the acknowledgement information managed in each of the acknowledgement information managing areas 37. The management table 60 will be explained using FIG. 15, which is a conceptual diagram of the management table 60. As shown in FIG. 15, the management table 60 holds the reception times t1 to tn of the BAR frames for the data corresponding to the acknowledgement information held for each of the management units 37-1 to 37-n (n: natural number).

The reception of a BAR frame is not limited to a case where a BAR frame is received explicitly as shown in the example of the frame sequence in FIG. 4. The reception time may be updated even when an acknowledgement request has been received implicitly by using an Implicit block acknowledgement request function newly determined in the IEEE 802.11n. The Implicit block acknowledgement request function is the function of being capable of requesting a BA frame without transmitting a BAR frame by giving specific information to the MAC header of a data frame. Thus, the data reception side may consider a BA frame response request by the Implicit block acknowledgement request function to be the same as a BA frame response request by a BAR frame.

When receiving a frame, the control unit 50 determines which one of the management units 37 is caused to hold acknowledgement information on the frame and manages the data transmitter (any one of the wireless LAN stations 3) and traffic ID of the acknowledgement information held in each of the management units 37. Moreover, the control unit 50 instructs any one of the management units 37 to discard and overwrite the held acknowledgement information. When instructing the management unit to discard the acknowledgement information, the control unit 50 refers to the management table 60 held in the reception time managing unit 51 and determines a management unit 37 to be caused to discard the acknowledgement information according to the reception time of the BAR frame.

The remaining configuration and operation are the same as those in the first embodiment, so an explanation of them will be omitted.

Next, the operation of the wireless LAN access point 2 configured as described above will be explained. The basic operation is the same as in FIG. 3 explained in the first embodiment. The third embodiment relates to the details of step S8 in FIG. 3. FIG. 16 is a flowchart to help explain the contents of step S8.

As shown in FIG. 16, the control unit 50 refers to the management table 60 in the reception time managing unit 51. Then, the control unit 50 searches for a management unit 37 with the reception time of the BAR frame closest to the present time in the management table 60 (step S20). That is, in FIG. 15, the control unit 50 searches for one of the management units 37-1 to 37-n which has the latest one of times t1 to tn.

Then, the control unit 50 instructs the management unit 37 searched for as a result of the search in step S20 to discard its acknowledgement information (step S21). Then, in step S7, the management unit 37 which discarded acknowledgement information in step S21 is set as a management unit for new reception.

As described above, the wireless communication system of the third embodiment produces the effect in item (3) below.

(3) The data transmitting efficiency in the wireless communication system can be improved (part 3).

With the configuration of the third embodiment, the decision unit 36 manages the reception time of a BAR frame and causes the management unit 37 with the reception time of the BAR frame closest to the present time to discard its acknowledgement information preferentially. As a result, a wasteful retransmission of frames is suppressed, producing the effect in item (1) explained in the first embodiment. The effect will be explained in detail below.

Figure 17:
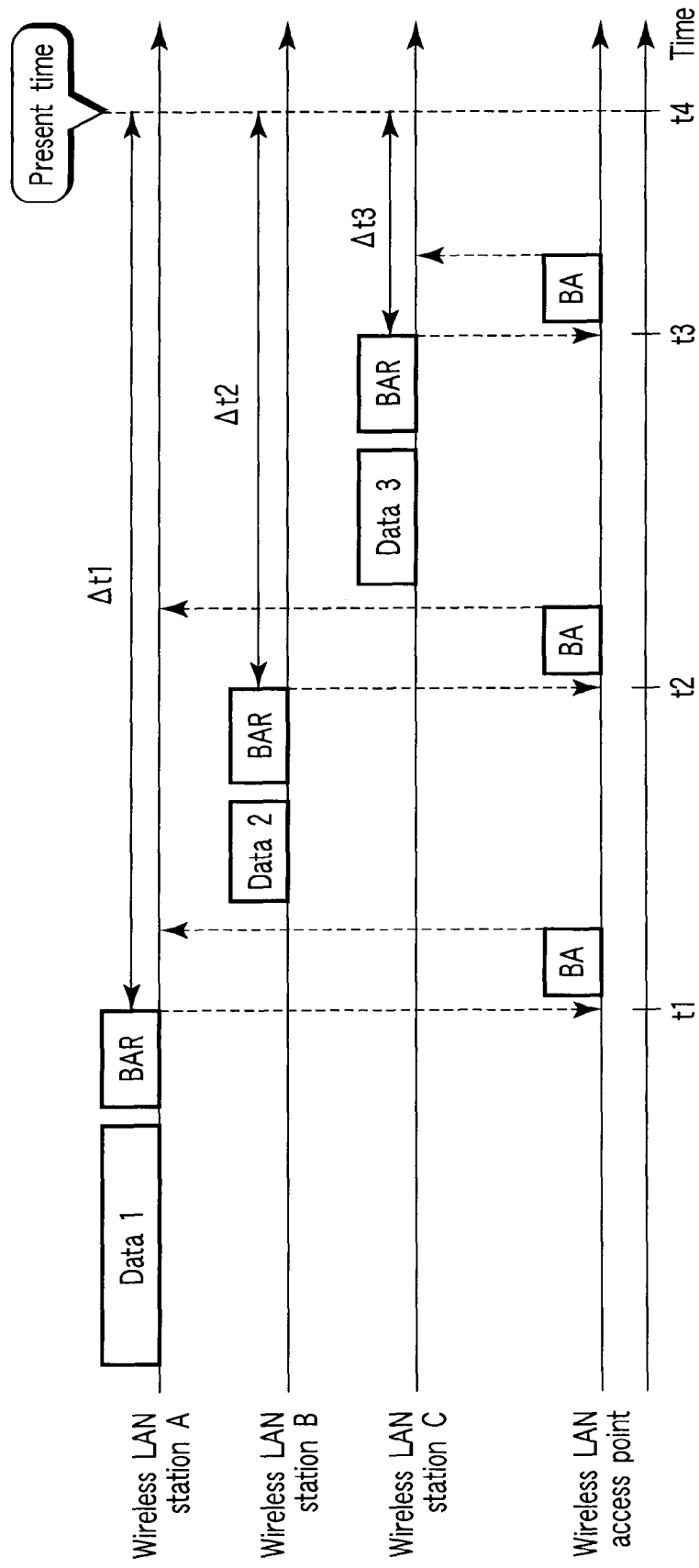
FIG. 17 is a timing chart to help explain the operation of a wireless LAN station and a wireless LAN access point in a wireless communication system according to the third embodiment.

Like the second embodiment, the third embodiment is based on decision means for discarding acknowledgement information whose information amount is the smallest. The information amount of acknowledgement information increases as the continuous transmission period of data gets longer. The time elapsed since a BAR frame was received is longer, the period in which data was transmitted continuously can be considered to be that much long. As a result, it can be determined that the information amount of the held acknowledgement information is large. Thus, discarding the acknowledgement information with the shortest reception time of the preceding BAR frame makes it possible to suppress a decrease in the efficiency due to a wasteful retransmission. Using FIG. 17, this will be explained more specifically. FIG. 17 is a timing chart to help explain the operation of three wireless LAN stations 3 (hereinafter, referred to as wireless LAN stations A, B, and C) and that of the wireless LAN access point 2, with the abscissa indicating time. Suppose the number of management units 37 is 3. In FIG. 17, each data item is a set of a plurality of data frames. The data frames included in the same data item are transmitted from the same wireless LAN station 3 and have the same traffic ID.

First, at time t1, the wireless LAN access point 2 receives a BAR frame for data 1 from wireless LAN station A. Then, the reception time managing unit 51 causes the management table 60 to hold time t1. Next, at time t2, the wireless LAN access point 2 receives a BAR frame for data 2 from wireless LAN station B. Then, the reception time managing unit 51 causes the management table 60 to hold time t2. Next, at time t3, the wireless LAN access point 2 receives a BAR frame for data 3 from wireless LAN station C. Then, the reception time managing unit 51 causes the management table 60 to hold time t3.

Suppose time t4 is the present time and the wireless LAN access point 2 receives data from any one of the wireless LAN stations A to C at this point in time. At this point in time, all the three management units 37 have acknowledgement information corresponding to data 1 to data 3, respectively. Accordingly, to hold acknowledgement information on the data received at time t4, the acknowledgement information in any one of the management units 37 has to be discarded.

Then, the control unit 50 refers to the management table 60 and discards the acknowledgement information on the data with the latest reception time of a BAR frame, that is, data 3. As shown in FIG. 17, if the periods from time t1, time t2, time t3 to the present time are Δt1, Δt2, and Δt3, respectively, it follows that Δt1>Δt2>Δt3. Accordingly, it can be expected that, for the data held in each of the management units 37 at time t4, data 1 transmitted by wireless LAN station A has the largest data amount and data 3 transmitted by wireless LAN station C is the smallest data amount. Thus, of the BAR frames of the individual data items, preferentially discarding the acknowledgement information corresponding to the frame whose preceding reception time is closest to the present time enables the amount of data retransmitted to be decreased. As a result, the effect explained using FIGS. 4 and 5 in the first embodiment can be obtained.

Fourth Embodiment

Figure 18:
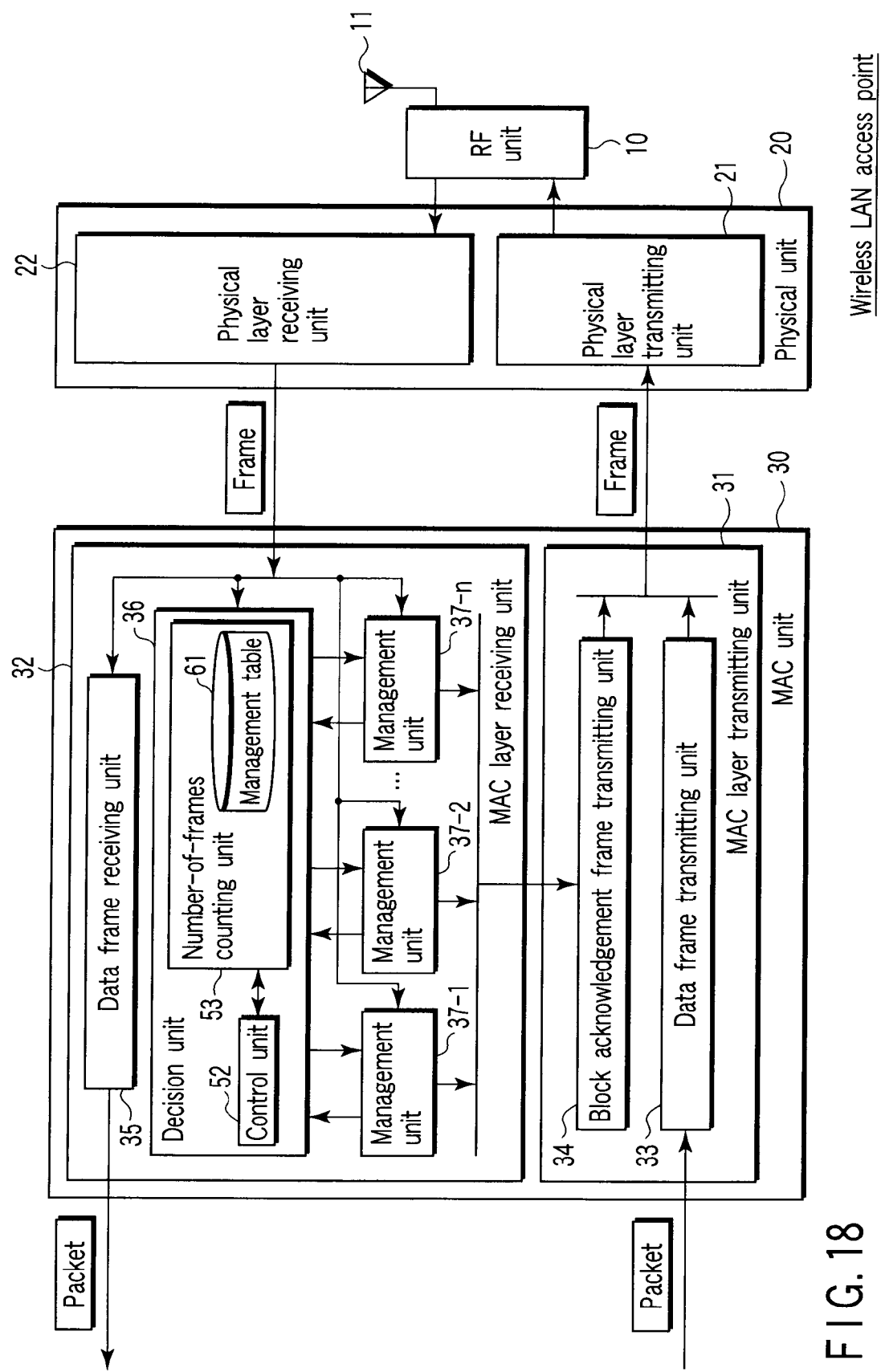
FIG. 18 is a block diagram of a wireless LAN access point according to a fourth embodiment of the invention.

Next, a wireless communication apparatus and a wireless communication method according to a fourth embodiment of the invention will be explained. Like the second and third embodiments, the fourth embodiment relates to a method of determining the size of the information amount of acknowledgement information. The fourth embodiment is such that the size of the information amount is determined by block acknowledgement bitmap information in place of the continuous transmission possible period or the BAR frame reception time. FIG. 18 is a block diagram of a wireless LAN access point 2 according to the fourth embodiment.

As shown in FIG. 18, the wireless LAN access point 2 of the fourth embodiment is such that a decision unit 36 includes a control unit 52 and a number-of-frames counting unit 53 in the configuration of FIG. 2 explained in the first embodiment.

The number-of-frames counting unit 53 holds in a management table 61 the number of data frames received properly on the basis of block acknowledgement bitmap information 43 included in the acknowledgement information managed in each of the acknowledgement information managing areas 37. Here, the block acknowledgement bitmap information 43 will be explained.

The block acknowledgement bitmap information 43 is represented by "0" and "1" data corresponding to the sequence number of each of data frames. Of the data, bit "1" indicates that the data frame corresponding to the sequence number corresponding to the bit position has been received. Conversely, bit "0" indicates that the data frame corresponding to the corresponding sequence number has not been received properly yet. The block acknowledgement bitmap information 43 is put in a BA frame, which is then transmitted to the wireless LAN station 3 functioning as the data transmitter. Then, the wireless LAN station 3, the data transmitter, knows that it has properly transmitted the data frame with the sequence number corresponding to bit "1". As for the data frame with the sequence number corresponding to bit "0", the wireless LAN station 3 retransmits a data frame. A concrete example of the block acknowledgement bitmap information 43 will be explained using FIGS. 19 and 20, which are a conceptual diagram of data and a conceptual diagram of the block acknowledgement bitmap information 43, respectively.

Figures 19, 20:
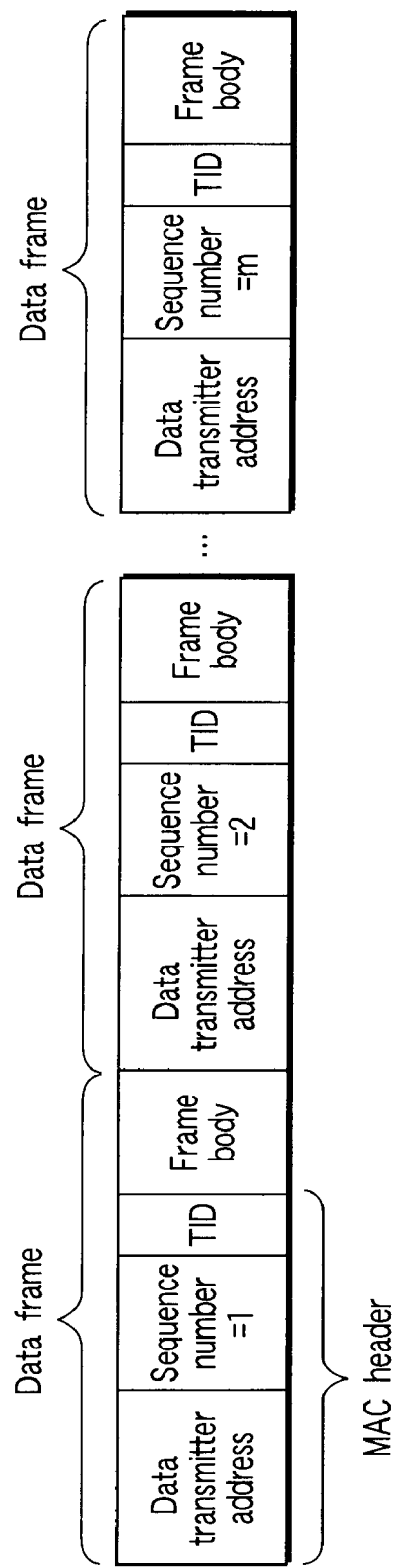
FIG. 19 is a conceptual diagram showing the configuration of data transmitted in a wireless communication system according to the fourth embodiment.
FIG. 20 is a conceptual diagram of block acknowledgement bitmap information held in the wireless LAN access point according to the fourth embodiment.
Figures 21, 22:
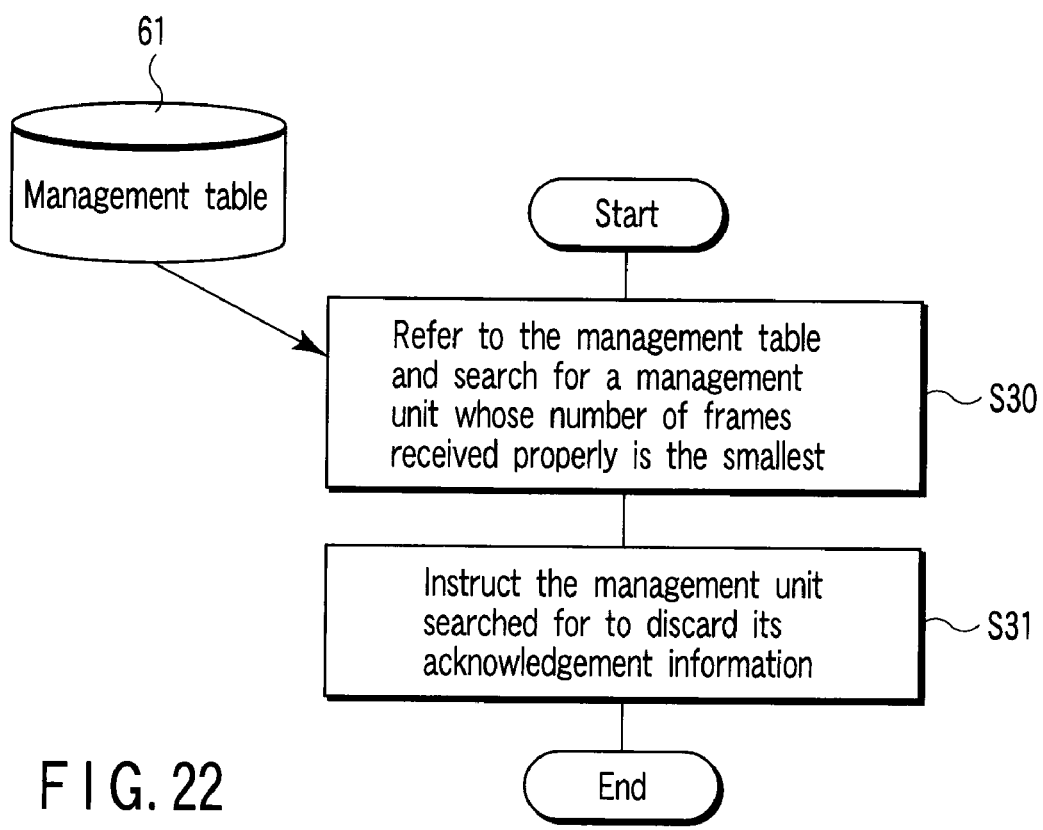
FIG. 21 schematically shows a management table held in the wireless LAN access point according to the fourth embodiment.
FIG. 22 is a flowchart to help explain the operation of the wireless communication access point according to the fourth embodiment.

First, as shown in FIG. 19, suppose data transmitted from a wireless LAN station 3 and managed under one traffic ID includes an m number of data frames (m is a natural number equal to or larger than 2), the sequence numbers attached to the individual frames being "1" to "m". FIG. 20 shows an example of block acknowledgement bitmap information 43 at this time. As shown in FIG. 20, the block acknowledgement bitmap information includes data frame numbers (=sequence numbers) and reception information corresponding to the data frame numbers. In the case of FIG. 20, the data frames whose sequence numbers are "1", "2", and "4" are those received and the data frames whose sequence numbers are "3" and "m" are those not received. In the information, the number of 1s is held in the management table 61. FIG. 21 is a conceptual diagram of the management table 61. As shown in FIG. 21, the management table 61 holds the number of data frames n1 to nn received properly in the held acknowledgement information, that is, the number of 1s in the block acknowledgement bitmap information 43, for each of the management units 37-1 to 37-n.

When receiving the frame, the control unit 52 determines which one of the management units 37 is to be caused to hold acknowledgement information on the frame and manages the data transmitter (any one of the wireless LAN stations 3) and traffic ID according to the acknowledgement information held in each of the management units 37. Moreover, the control unit 52 instructs any one of the management units 37 to discard and overwrite the held acknowledgement information. When instructing the discard of acknowledgement information, the control unit 52 refers to the management table 61 held in the reception time managing unit 53 and determines a management unit 37 caused to discard its acknowledgement information on the basis of the number of data frames received properly.

The remaining configuration and operation are the same as those in the first embodiment, so an explanation of them will be omitted.

Next, the operation of the wireless LAN access point 2 configured as described above will be explained. The basic operation is the same as in FIG. 3 explained in the first embodiment. The fourth embodiment relates to the details of step S8 in FIG. 3. FIG. 22 is a flowchart to help explain step S8.

As shown in FIG. 22, the control unit 52 refers to the management table 61 in a number-of-received-frames counting unit 53. Then, the control unit 52 searches for a management unit 37 whose number of data frames received properly is the smallest in the management table 61 (step S30). That is, in FIG. 21, the control unit 52 searches the management table 61 for one of the management units 37-1 to 37-n which has the smallest one of the number of data frames n1 to the number of data frames nn.

Then, the control unit 52 instructs the management unit 37 searched for as a result of the search in step S30 to discard its acknowledgement information (step S31). Then, in step S7, the management unit 37 whose acknowledgement information was discarded in step S31 is set for new reception.

As described above, the wireless communication system of the fourth embodiment produces the effect in item (4) below.

(4) The data transmitting efficiency in the wireless communication system can be improved (part 4).

With the configuration of the fourth embodiment, the decision unit 36 manages the number of is in the block acknowledgement bitmap information 43 in the configuration of the first embodiment and causes the management unit 37 whose number of bits is the smallest to discard its acknowledgement information preferentially. As a result, a wasteful retransmission of frames is suppressed, producing the effect in item (1) explained in the first embodiment. The effect will be explained in detail below.

When acknowledgement information is discarded at the wireless LAN access point 2, all the is held until then as the block acknowledgement bitmap information 43 are cleared to "0", which leads to a wasteful retransmission. The larger the number of is, the larger the information amount of the acknowledgement information is. Accordingly, the control unit 53 determines the discard of acknowledgement information with a smaller number of 1s and instructs the corresponding acknowledgement information managing area to discard its acknowledgement information.

In the fourth embodiment, means for leaving pieces of the held acknowledgement information with a larger information amount is the same as in the first to third embodiments. Since the information amount is determined by the number of received label bits in the block acknowledgement bitmap information, the means can be considered to be adjusted to the actual information amount. Thus, the fourth embodiment produces the effect explained using FIGS. 4 and 5 in the first embodiment. For example, when data 3 has been received at time t6 in FIG. 5, acknowledgement information corresponding to either data 1 or data 2 has to be discarded. Then, the control unit 53 compares the number of 1s in block acknowledgement bitmap information on data 1 with the number of 1s in block acknowledgement bitmap information on data 2. Generally, since data 1 whose data amount is larger has a larger number of 1s than data 2, the control unit 53 discards acknowledgement information on data 2. Consequently, a retransmission of data 1 is not needed, which enables the time needed for a wasteful retransmission to be suppressed.

As described above, with the wireless communication apparatus and wireless communication method according to the first to fourth embodiments, when it is determined which piece of acknowledgement information is to be discarded, the acknowledgement information with the smallest information amount is discarded preferentially. More specifically, acknowledgement information whose continuous transmission possible period is shorter, acknowledgement information with the latest reception time of the previously received BAR frame, or acknowledgement information with a smaller number of 1s in block acknowledgement bitmap information is discarded. As a result, a wasteful retransmission of data is suppressed, which enables efficient data communication. That is, in the first embodiment, any one of the pieces of acknowledgement information is discarded according to its information amount. However, when it is difficult to know the information amount itself, the information amount of acknowledgement information in each of the management units 37-1 to 37-n is estimated by the methods explained in the second to fourth embodiments. The decision unit 36 instructs the management unit whose information amount is the smallest as a result of the estimation to discard its acknowledgement information. In this case, a high-accuracy estimate can be made using the continuous transmission possible period, the reception time of a BAR frame, the block acknowledgement bitmap information, or the like. The estimation method is not limited to those explained in the second to fourth embodiments. Other various suitable methods may be used for the estimation.

In the first to fourth embodiments, the data receiving apparatus has been a wireless LAN access point. Of course, the receiving apparatus may be a wireless LAN station. In this case, a data transmitter is a wireless LAN access point. Furthermore, in the frame sequence explained using FIG. 5, frames may be aggregated in the continuous transmission possible period and transmitted. Alternatively, a plurality of frames may be transmitted at regular intervals of time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus which is capable of receiving a plurality of items of data each including a plurality of data frames each transmitted from the same data transmitter and managed under the same traffic identifier and which, in response to the reception of the data, acknowledges the transmission of the data for the data transmitter, the wireless communication apparatus comprising:
 a plurality of management units each of which holds acknowledgement information to acknowledge the transmission for each of the items of data; and
 a decision unit which, when the data is newly received, causes a management unit, which holds the acknowledgement information with smallest information amount among the plurality of management units, to discard the acknowledgement information and to hold the acknowledgement information on the newly received data.

2. The apparatus according to claim 1, wherein the acknowledgement information indicates that each of the data frames has been received properly.

3. A wireless communication apparatus which is capable of receiving a plurality of items of data each including a plurality of data frames each transmitted from the same data transmitter and managed under the same traffic identifier and which, in response to the reception of the data, acknowledges the transmission of the data for the data transmitter, the wireless communication apparatus comprising:
 a plurality of management units each of which holds acknowledgement information to acknowledge the transmission for each of the items of data; and
 a decision unit which, when the data is newly received, causes one of the management units, which is estimated to hold the acknowledgement information with smallest information amount among the plurality of management units, to discard the acknowledgement information and to hold the acknowledgement information on the newly received data.

4. The apparatus according to claim 3, wherein the decision unit includes
 a transmission period managing unit which holds a continuous transmission possible period at a transmission opportunity of data corresponding to the acknowledgement information held in each of the management units, and
 a control unit which refers to the transmission period managing unit, searches for one of the management units holding the acknowledgement information on the data transmitted at the transmission opportunity with the shortest continuous transmission possible period, and instructs the one of the management units searched for to discard the acknowledgement information.

5. The apparatus according to claim 4, wherein the data is allocated priority correlating with the traffic identifier,
 the continuous transmission possible period is varied according to the priority, and
 the decision unit grasps the continuous transmission possible period on the basis of the traffic identifier.

6. The apparatus according to claim 4, wherein the continuous transmission possible period is determined on the basis of information on communication band negotiation conducted for each item of data before the transmission and reception of the data.

7. The apparatus according to claim 3, wherein the transmission is acknowledged for the data transmitter in response to the reception of an acknowledgement request transmitted continuously with the data,
 the decision unit includes
 a reception time managing unit which holds a reception time of the acknowledgement request corresponding to the data held in each of the management units, and
 a control unit which refers to the reception time managing unit, searches for one of the management units holding the acknowledgement information on the data corresponding to the acknowledgement request with latest reception time, and instructs the one of the management units searched for to discard the acknowledgement information.

8. The apparatus according to claim 3, wherein the acknowledgement information is information indicating whether each of the data frames included in each item of the data has been received properly,
 the decision unit includes
 a number-of-data-frames managing unit which holds the number of data frames received properly for each of the management units, and
 a control unit which refers to the number-of-data-frames managing unit, searches for one of the management units holding the acknowledgement information with the smallest number of data frames received properly, and instructs the one of the management unit searched for to discard the acknowledgement information.

9. The apparatus according to claim 3, further comprising:
 a reception unit which receives the data from a wireless communication terminal and which includes the management units and the decision unit; and
 a transmission unit which transmits the data to a wireless communication terminal,
 wherein the transmission unit includes a data frame transmitting unit which assembles a data frame from packets and transmits the data to the wireless communication terminal, and an acknowledgement frame transmitting unit which assembles an acknowledgement frame according to the acknowledgement information held in the management units and transmits the frame to the wireless communication terminal.

10. A wireless communication method of a wireless communication apparatus including a plurality of management units capable of holding acknowledgement information for acknowledging the transmission of data, and a decision unit which discards the acknowledgement information, the method comprising:
 receiving, at the wireless communication apparatus, data which needs acknowledgement of transmission;
 determining, by the decision unit, whether there is an empty management unit in the plurality of management units;
 if there is no empty management unit, searching for one of the management units, by the decision unit, which holds the acknowledgement information with smallest information amount;
 causing, by the decision unit, the one of the management units determined to hold the acknowledgement information with the smallest information amount as a result of the searching, to discard the acknowledgement information; and causing, by the decision unit, the one of the management units caused to discard the acknowledgement information to hold the acknowledgement information on the received data.

11. The method according to claim 10, wherein the data includes a plurality of data frames transmitted from the same data transmitter and managed under the same traffic identifier, and the information amount of the acknowledgement information is information indicating that each of the data frames has been received properly.

12. The method according to claim 10, wherein the searching for the one of the management units includes checking a continuous transmission possible period at a transmission opportunity of data corresponding to the acknowledgement information held in each of the management units, and determining one of the management units holding the acknowledgement information on the data transmitted at the transmission opportunity with the shortest continuous transmission possible period to be the one of the management units with the smallest information amount.

13. The method according to claim 10, wherein the transmission is acknowledged for the data transmitter in response to the reception of an acknowledgement request transmitted continuously with the data, and the searching for the one of the management units includes checking the reception time of the acknowledgement request corresponding to the data held in each of the management units, and determining one of the management units, which holds the acknowledgement information on the data corresponding to the acknowledgement request with latest reception time, to be the one of the management units with the smallest information amount.

14. The method according to claim 10, wherein the data includes a plurality of data frames transmitted from the same data transmitter and managed under the same traffic identifier, the acknowledgement information is information indicating that each of said plurality of data frames included in each item of the data has been received properly, and the searching for the one of the management units includes checking the number of data frames received properly for each of the management units, and determining one of the management units holding the acknowledgement information with the smallest number of data frames received properly to be the one of the management units with the smallest information amount.

* * * * *